(12) United States Patent
Hatch

(10) Patent No.: US 10,386,011 B2
(45) Date of Patent: *Aug. 20, 2019

(54) TELESCOPING LOCK MECHANISM

(71) Applicant: Joshua Terry Hatch, Dayton, ID (US)

(72) Inventor: Joshua Terry Hatch, Dayton, ID (US)

(73) Assignee: Joshua Terry Hatch, Dayton, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,692

(22) Filed: Feb. 1, 2018

(65) Prior Publication Data

US 2018/0156378 A1 Jun. 7, 2018

Related U.S. Application Data

(63) Continuation of application No. 14/860,684, filed on Sep. 21, 2015, now Pat. No. 9,903,528.

(60) Provisional application No. 62/053,511, filed on Sep. 22, 2014.

(51) Int. Cl.
*F16M 11/26* (2006.01)
*F16B 7/14* (2006.01)
*F16M 11/28* (2006.01)

(52) U.S. Cl.
CPC .......... *F16M 11/26* (2013.01); *F16B 7/1409* (2013.01); *F16M 11/28* (2013.01)

(58) Field of Classification Search
CPC ........ F16M 11/26; F16M 11/28; F16M 11/32; F16M 11/34; F16M 2200/027; F16B 7/1409; F16B 7/1436; F16B 7/1445; F16B 2/16; Y10T 403/32467; Y10T 403/32475; Y10T 403/32483; Y10T 403/32501; Y10T 403/32516
USPC .......... 248/125.8, 159, 161, 412; 403/109.1, 403/109.2, 109.3, 109.5, 109.7
See application file for complete search history.

(56) References Cited

U.S. PATENT DOCUMENTS

| | | | | | |
|---|---|---|---|---|---|
| 2,010,306 | A | * | 8/1935 | Leech | A47C 3/285 108/139 |
| 2,658,777 | A | * | 11/1953 | Rauglas | F16B 7/1409 248/188.5 |
| 2,693,980 | A | * | 11/1954 | Heidman, Jr. | B64D 17/383 24/607 |
| 3,117,484 | A | * | 1/1964 | Myers | F16B 5/0208 411/348 |
| 3,228,647 | A | * | 1/1966 | Musianowycz | A47C 3/285 248/412 |

(Continued)

*Primary Examiner* — Jonathan Liu
*Assistant Examiner* — Guang H Guan
(74) *Attorney, Agent, or Firm* — Maschoff Brennan

(57) ABSTRACT

The present disclosure may include a leg comprising first and second tubes, the first tube inside of the second tube, a lock mechanism within the second tube, the lock mechanism including a plug, a ramp, and bearings configured to roll along the ramp and contact the ramp and at least an interior wall of the first tube such that as the one or more bearings contact the ramp and the interior wall of the first tube, motion of the second tube relative to the first tube is inhibited, and a third tube inside of the second tube, and in response to the third tube being substantially disposed within the second tube, a proximate end of the third tube configured to push the one or more bearings towards the plug, reducing the interference of the one or more bearings with the interior wall of the first tube.

8 Claims, 24 Drawing Sheets

(56) References Cited

U.S. PATENT DOCUMENTS

| | | | | |
|---|---|---|---|---|
| 3,259,407 | A * | 7/1966 | Welt | F16B 7/1427 403/350 |
| 3,807,574 | A * | 4/1974 | Lanza | A47F 5/06 211/207 |
| 3,835,486 | A * | 9/1974 | Benoit | A61G 7/0503 248/161 |
| 4,374,581 | A * | 2/1983 | Karapita | A61M 5/1415 248/337 |
| 4,445,660 | A * | 5/1984 | Karapita | F16B 7/1409 248/335 |
| 4,643,472 | A * | 2/1987 | Schukei | B66C 1/56 294/82.28 |
| 4,695,021 | A * | 9/1987 | Leinfelder | F16M 11/32 248/163.1 |
| 4,706,916 | A * | 11/1987 | Cullmann | F16B 7/1463 248/168 |
| 5,815,974 | A * | 10/1998 | Keng | F41A 23/08 42/94 |
| 6,027,087 | A * | 2/2000 | Lindemann | A63C 11/221 248/188.5 |
| 6,390,722 | B1 * | 5/2002 | Godfrey | F16B 21/165 294/82.28 |
| 6,523,707 | B2 * | 2/2003 | Liu | A45B 19/04 211/206 |
| 6,609,686 | B2 * | 8/2003 | Malizia | F16B 7/1409 248/125.8 |
| 6,663,071 | B2 * | 12/2003 | Peterson | F16M 11/26 248/440.1 |
| 6,698,698 | B1 * | 3/2004 | Hsieh | F16B 7/105 248/125.8 |
| 6,824,319 | B1 * | 11/2004 | Speggiorin | F16C 11/10 248/168 |
| 6,913,231 | B2 * | 7/2005 | Speggiorin | F16M 11/32 248/169 |
| 7,204,466 | B2 * | 4/2007 | Hsieh | F16B 7/105 248/157 |
| 7,426,800 | B2 * | 9/2008 | Pierce | F41A 23/10 248/166 |
| 7,506,846 | B2 * | 3/2009 | Speggiorin | F16B 7/1409 248/157 |
| 7,574,768 | B2 * | 8/2009 | Morris | B25G 3/28 15/143.1 |
| 7,779,572 | B2 * | 8/2010 | Potterfield | F41A 23/10 42/94 |
| 7,845,602 | B1 * | 12/2010 | Young | F16B 7/1409 248/125.8 |
| 8,146,876 | B1 * | 4/2012 | Young | F16B 7/1409 248/161 |
| 8,251,606 | B2 * | 8/2012 | Blanchard | A01B 33/028 294/57 |
| 8,256,732 | B1 * | 9/2012 | Young | F16B 7/1409 248/161 |
| 8,529,151 | B2 * | 9/2013 | Blanchard | A01B 33/028 403/322.2 |
| 8,820,693 | B1 * | 9/2014 | Young | F16B 7/1409 248/161 |
| 9,010,710 | B1 * | 4/2015 | Young | F16B 7/1409 248/161 |
| 9,126,647 | B2 * | 9/2015 | Kuo | B62J 1/08 |
| 9,163,651 | B2 * | 10/2015 | Ostrobrod | A62B 35/0068 |
| 9,285,075 | B2 * | 3/2016 | Moody | F41A 23/08 |
| 9,903,528 | B1 * | 2/2018 | Hatch | F16M 11/26 |
| 2003/0123926 | A1 * | 7/2003 | Lin | F16B 7/042 403/109.5 |
| 2004/0129843 | A1 * | 7/2004 | Pernstich | F16B 7/1427 248/163.1 |

* cited by examiner

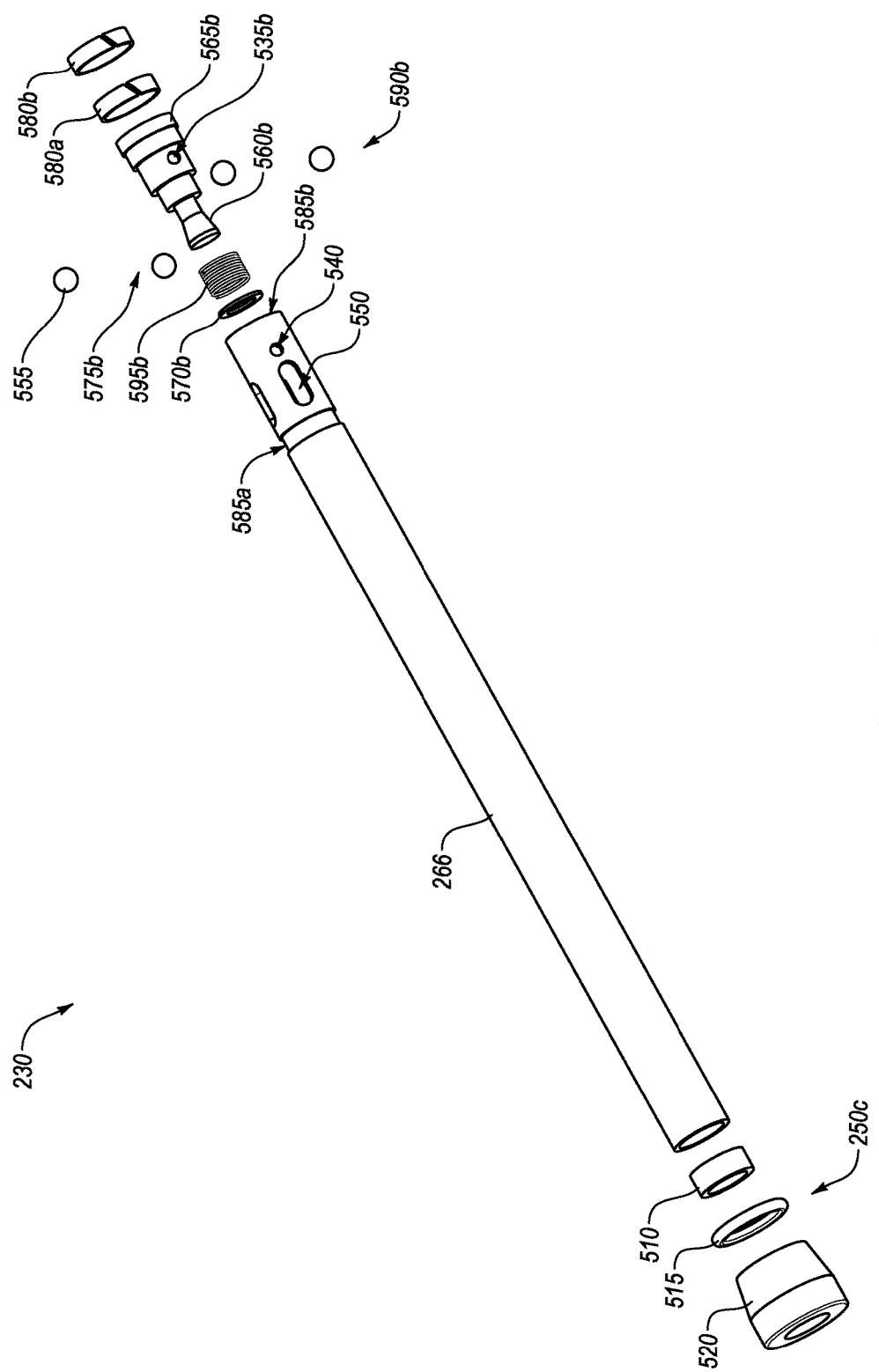

TELESCOPING LOCK MECHANISM

CROSS-REFERENCE TO A RELATED APPLICATION

This application claims priority to U.S. patent application Ser. No. 14/860,684, filed Sep. 21, 2015, and titled "TELESCOPING LOCK MECHANISM," which claims priority to Provisional Patent Application No. 62/053,511, filed Sep. 22, 2014, and titled "ADJUSTABLE BIPOD," which are incorporated herein by reference in their entireties.

FIELD

The embodiments discussed in the present disclosure are related to a lock mechanism and an adjustable bipod.

SUMMARY

One or more embodiments of the present disclosure may include a telescoping leg including a first tube that is slidably disposed inside of a second tube. The telescoping leg may also include a lock mechanism disposed within the second tube. The lock mechanism may include a plug and a ramp that includes a first ramp end that is coupled to the plug and a second ramp end that is opposite to and has a wider diameter than the first ramp end. The telescoping leg may also include one or more bearings configured to roll along the ramp and sized to contact the ramp and at least an interior wall of the first tube through one or more corresponding openings in the second tube as the one or more bearings approach the second ramp end. As the one or more bearings contact the ramp and the interior wall of the first tube, interference of the one or more bearings with the interior wall of the first tube may substantially inhibit motion of the second tube relative to the first tube. The telescoping leg may also include a third tube with a proximate end proximate the second tube and a distal end away from the second tube. The third tube may be slidably disposed inside of the second tube, and in response to the third tube being substantially disposed within the second tube, the proximate end of the third tube may push the one or more bearings towards the plug, reducing the interference of the one or more bearings with the interior wall of the first tube.

It is to be understood that both the foregoing general description and the following detailed description are given as examples and are explanatory and are not restrictive of the present disclosure.

BRIEF DESCRIPTION OF THE DRAWINGS

Example embodiments will be described and explained with additional specificity and detail through the use of the accompanying drawings in which:

FIG. 5b illustrates a second example embodiment of a second middle portion of a self-locking telescopic leg;

DESCRIPTION OF EMBODIMENTS

People often rely on telescoping support devices such as monopods, bipods, and tripods to maintain an object in a steady position while performing tasks. These support devices may be used to provide easier access to materials, comfortable accommodations, or stability while performing precise maneuvers. For example, such telescoping support devices may be used to keep a firearm, a camera, binoculars, a monocular, a scope, etc. steady. For example, an individual may use a monopod, bipod, or tripod while aiming a firearm to increase accuracy of a shot.

A problem associated with some bipods is that they may only work in a relatively limited height range. A limited height range may be inadequate for a variety of reasons. For example, an individual may wish to use the bipod while standing, sitting, or lying down and a limited height range may not allow for such a large range of use. As such, an individual may purchase multiple bipods, each configured with a different height range, and interchange among the bipods as required for a given situation. For example, when the individual intends to use the supported object near to the ground, one bipod may be used. When the individual wishes to revert to a sitting position, the individual may need to use a different bipod in place of the first bipod. Additionally or alternatively, some bipods may be cumbersome to adjust the length of the legs and/or to lock the legs in position.

Additionally, if a bipod is being used on uneven ground, a support surface of the bipod that may be configured to connect to the supported object may not be level with the ground, which may then hinder the ability of the individual to use the supported object. In addition, it may be necessary to move the bipod along with the supported object. Long or unwieldy legs may necessitate detaching the supported object from the bipod and later reattaching them. Such a process of detaching and reattaching is often cumbersome, especially when speed is of the essence. For example, when a hunter is attempting to hunt prey, a steady firearm can be beneficial. If the prey begins to flee and the hunter wishes to pursue, a large attached bipod may render the movements of the hunter less effective or ineffective, for example, by catching brush or other vegetation. In light of the above, according to one or more embodiments of the present disclosure, an adjustable bipod may be configured in a manner to be easily adjusted to a variety of heights, provide a level support surface, be quickly attached and detached from the supported object, and be easily transported along with the supported object.

Embodiments of the present disclosure will be explained with reference to the accompanying drawings.

Figure 1:
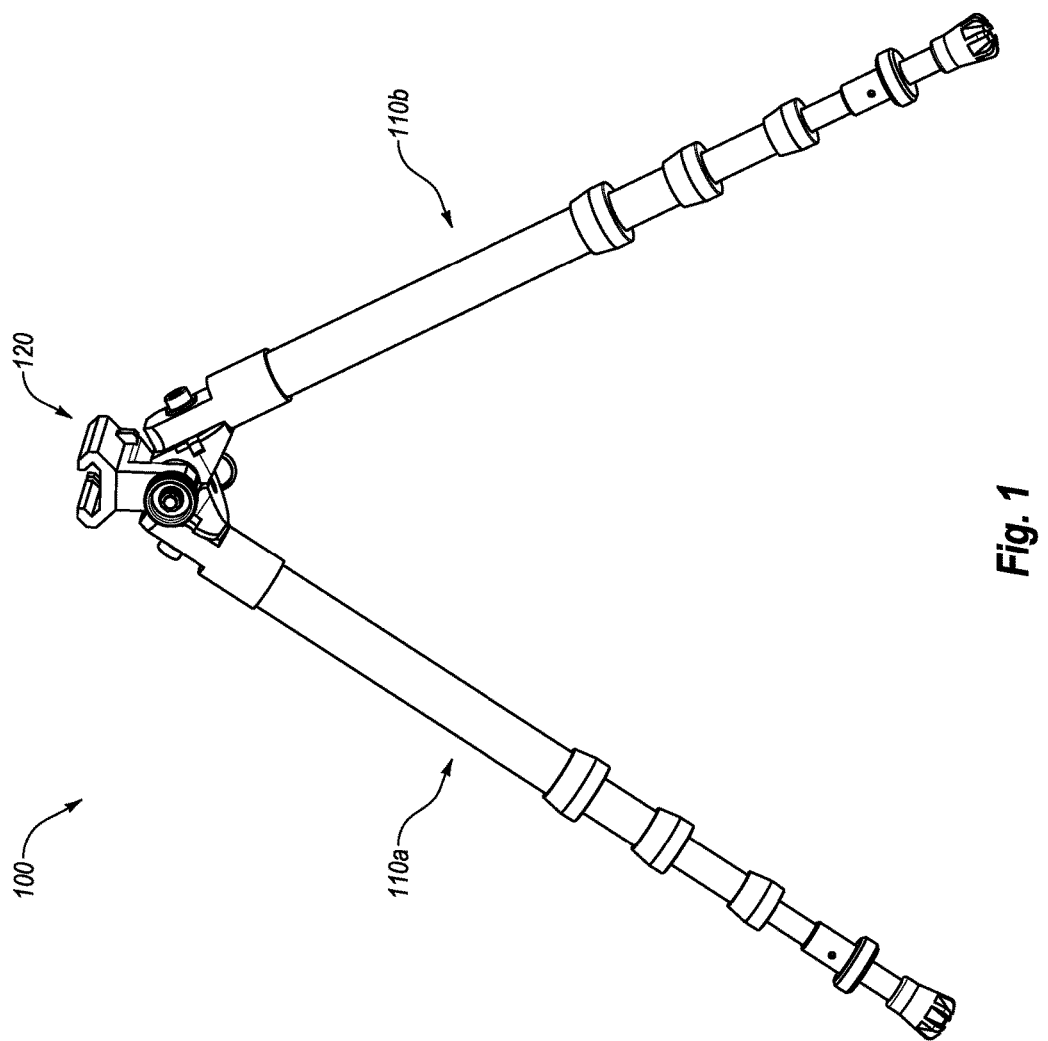
FIG. 1 illustrates an isometric view of an example embodiment of an adjustable bipod.

FIG. 1 illustrates an isometric view of an example embodiment of an adjustable bipod 100. The adjustable bipod 100 may include two self-locking telescopic legs 110a and 110b and a torso 120. Each of the self-locking telescopic legs 110a and 110b may be independently extended or retracted, which may allow a user to achieve a target height for the supported object in a variety of terrains. Each of the self-locking telescopic legs 110a and 110b may be configured to be freely extendible, may include a lock mechanism to prevent or restrict unintentional retraction, and may include a mechanism to allow the retraction of the self-locking telescopic legs 110a and 110b.

The torso 120 may be configured to provide a connecting interface between the self-locking telescopic legs 110a and 110b and may also be configured to receive an object that may be supported by the adjustable bipod 100. The torso 120 may be configured to allow the angle between the self-locking telescopic legs 110a and 110b to change when they are in the deployed position. The torso 120 may also be configured to allow the supported object to rotate or be locked in a target rotational position, for example, a rotation such that the supported object is level during use. The torso 120 may be configured to allow the object to be quickly attached to the torso 120 and quickly removed from the torso 120. The self-locking telescopic legs 110a and 110b and the torso 120 may be configured to allow the self-locking telescopic legs 110a and 110b to be in a deployed position, a forward-facing position, or a rearward-facing position, or any other position. For example, the self-locking telescopic legs 110a and 110b may be configured to rotate independently in nearly any direction relative to the torso 120.

Modifications, additions, or omissions may be made to the adjustable bipod 100 of FIG. 1 without departing from the scope of the present disclosure. As another example, the torso 120 may take any form or feature to enable a supported device such as a firearm, a camera, binoculars, a monocular, a scope, etc. or other supported object to be removably coupled to the adjustable bipod 100. Additionally, the visual depiction of the adjustable bipod 100 of FIG. 1 is for example purposes of describing principles of some embodiments of the present disclosure and is not limiting. Any number of visual appearances of an adjustable bipod 100 are still within the scope of the present disclosure.

Figure 2:
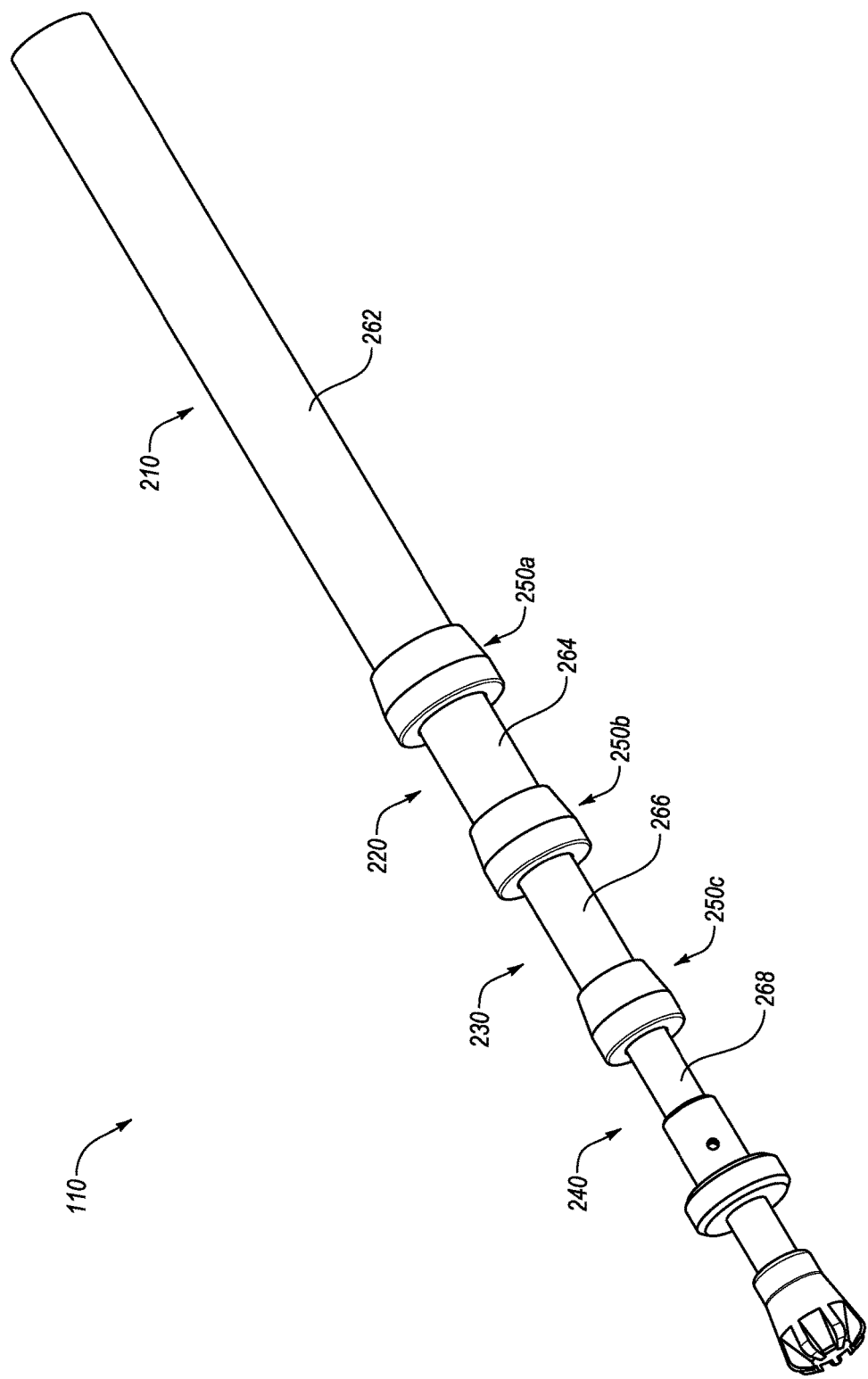
FIG. 2 illustrates a view of an example embodiment of a self-locking telescopic leg.

FIG. 2 illustrates a view of an example embodiment of a self-locking telescopic leg 110, such as the self-locking telescopic legs 110a and/or 110b of FIG. 1 (referred to hereinafter as the "leg" 110). The leg 110 may include an upper portion 210 and a lower portion 240. The leg 110 may include any number of middle portions 220 and 230. In the illustrated embodiment, the leg 110 is depicted as including two middle portions, a first middle portion 220 and a second middle portion 230, however the leg 110 may include any number of middle portions including no middle portions in which the lower portion 240 is directly adjacent to the upper portion 210. The upper portion 210 may have a larger cross-sectional area than the first middle portion 220, allowing the first middle portion 220 to slide inside of the upper portion 210. The first middle portion 220 may have a larger cross-sectional area than the second middle portion 230, allowing the second middle portion 230 to slide inside of the first middle portion 220. The second middle portion 230 may have a larger cross-sectional area than the lower portion 240, allowing the lower portion 240 to slide inside of the second middle portion 230. However, the reverse may also be true. The upper portion 210 may have a smaller cross-sectional area than the first middle portion 220, allowing the upper portion 210 to slide inside of the first middle portion 220. The first middle portion 220 may have a smaller cross-sectional area than the second middle portion 230, allowing the first middle portion 220 to slide inside of the second middle portion 230. The second middle portion 230 may have a smaller cross-sectional area than the lower portion 240, allowing the second middle portion 230 to slide inside of the lower portion 240. The upper portion 210, the first middle portion 220, and the second middle portion 230 may each include a collar assembly, such as collar assemblies 250a, 250b, and 250c, respectively, that may be configured to prevent or restrict the leg portions from separating. The leg portions 210, 220, 230, and 240 may each include a tube 262, 264, 266, and 268, respectively.

Modifications, additions, or omissions may be made to the self-locking telescopic leg 110 of FIG. 2 without departing from the scope of the present disclosure. For example, the leg 110 may include any number of middle portions, including no middle portions. Additionally, the visual depiction of the self-locking telescopic leg 110 of FIG. 2 is for example purposes of describing principles of some embodiments of the present disclosure and is not limiting. Any number of visual appearances of a leg 110 are still within the scope of the present disclosure.

Figure 3:
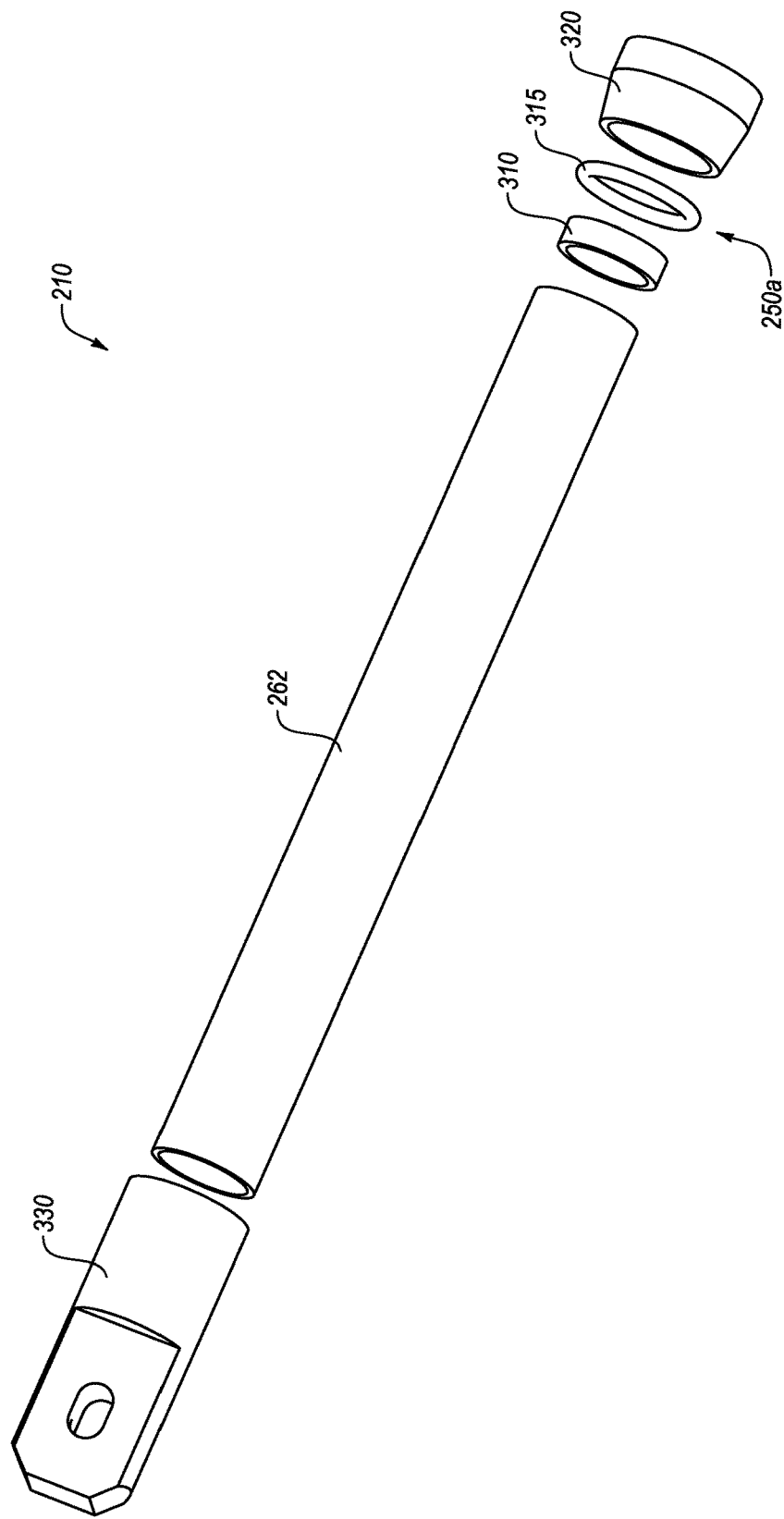
FIG. 3 illustrates an example embodiment of an upper portion of a self-locking telescopic leg.

FIG. 3 illustrates an example embodiment of an upper portion 210 of a self-locking telescopic leg, such as the leg 110 of FIG. 2. The upper portion 210 of the leg may include a tube 262, which may be coupled to a hip block 330 (described in greater detail below with respect to FIGS. 9a and 9b). The tube 262 may be a straight cylinder as depicted in FIG. 3 or it may have any other cross-sectional shape and/or longitudinal curvature. A wiper 310 may be placed at one end of the tube 262, with a gasket 315 placed surrounding the wiper 310. The gasket 315 and wiper 310 may be placed inside a collar 320, which may be attached to one end of the tube 262. The wiper 310, gasket 315, and collar 320 may form a collar assembly 250a that may be configured to prevent or restrict the upper portion 210 and an adjacent middle portion, such as the first middle portion 220 of FIG. 2, from separating. Alternatively or additionally, any other mechanism could be used to prevent or restrict the leg portions from separating.

The tube 262 may be sized and/or configured to receive one or more other portions of the leg. For example, the tube 262 may be sized such that other portions of the leg may at least partially be slid or disposed within the tube 262.

Modifications, additions, or omissions may be made to the upper portion 210 of FIG. 3 without departing from the scope of the present disclosure. For example, the upper portion 210 may include any number of middle portions, including no middle portions. Additionally, the visual depiction of the upper portion 210 is for example purposes of describing principles of some embodiments of the present disclosure and is not limiting. Any number of visual appearances of an upper portion are within the scope of the present disclosure.

Figure 4A:
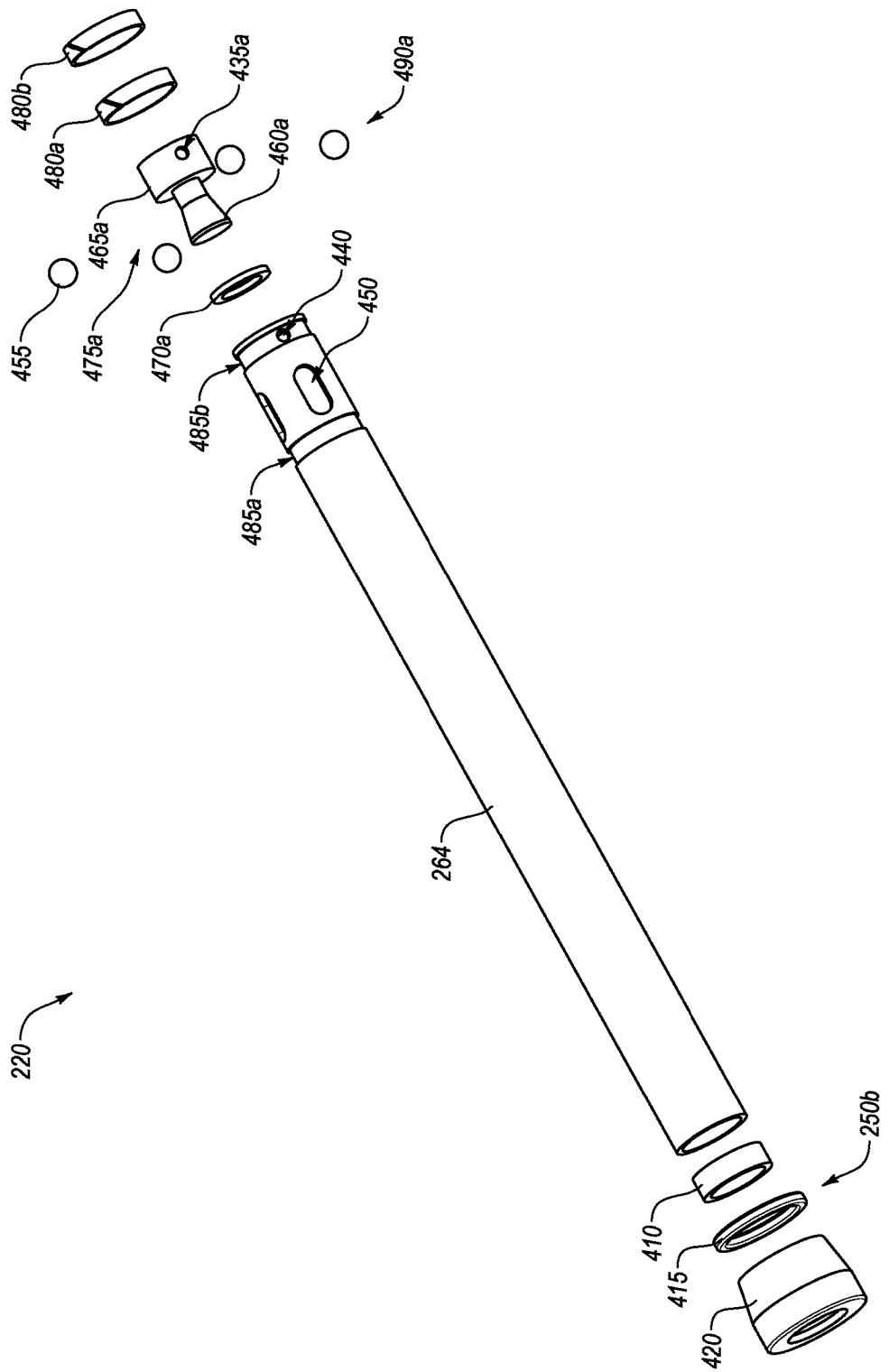
FIG. 4a illustrates a first example embodiment of a first middle portion of a self-locking telescopic leg.
Figure 4B:
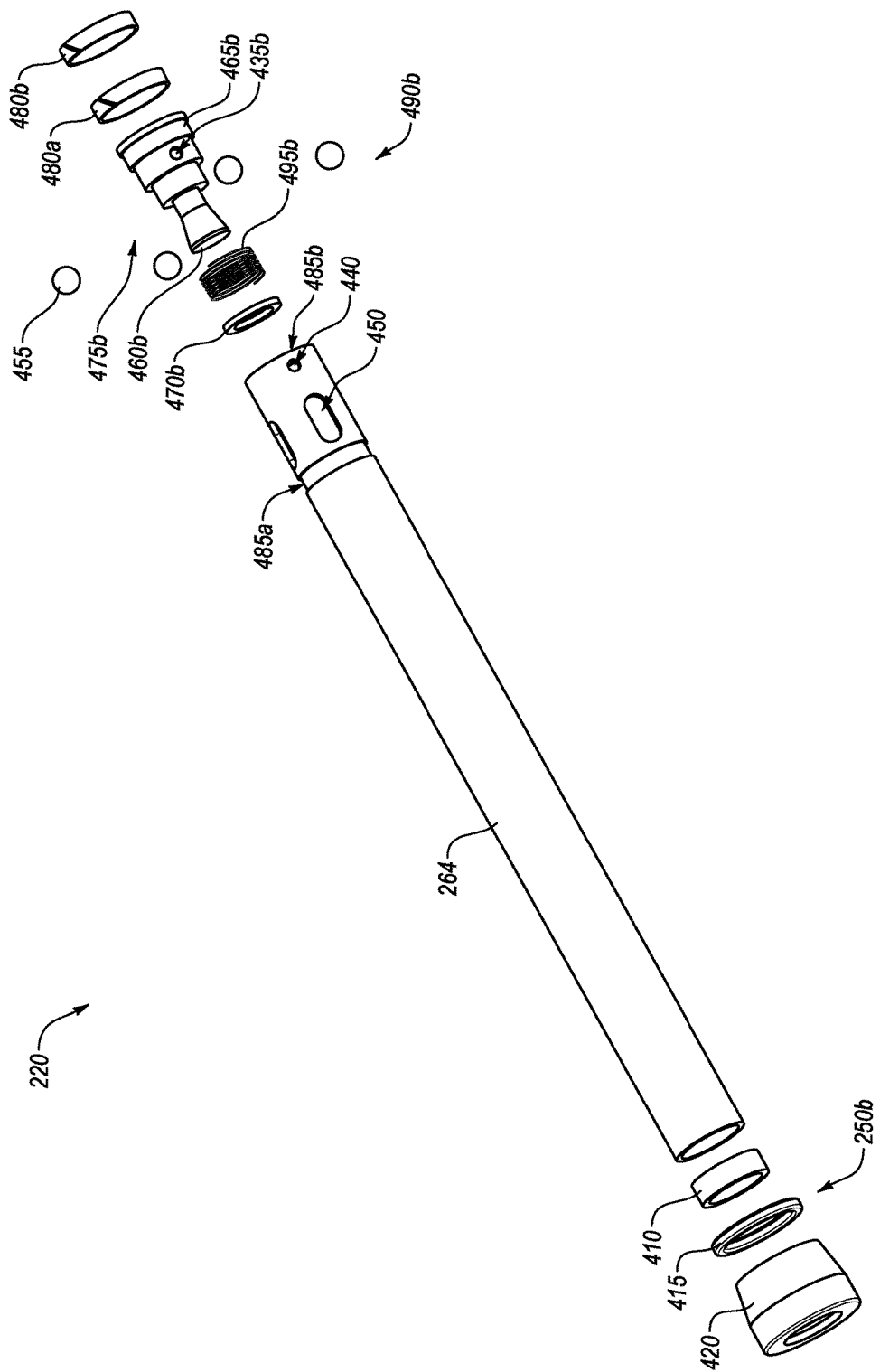
FIG. 4b illustrates a second example embodiment of a first middle portion of a self-locking telescopic leg.

FIGS. 4a and 4b depict example embodiments of a first middle portion 220 of a self-locking telescopic leg, such as the leg 110 of FIG. 2. FIGS. 4a and 4b also illustrate first and second example embodiments of a lock device, 475a and 475b, respectively. The first middle portion 220 may include a tube 264, such as the tube 264 of FIG. 2. The tube 264 may be a straight cylinder as depicted in FIG. 4a or it may have any other cross-sectional shape and/or longitudinal curvature. A wiper 410 may be placed at one end of the tube 264, with a gasket 415 placed surrounding the wiper 410. The gasket 415 and wiper 410 may be placed inside a collar 420, which may be attached to one end of the tube 264. The wiper 410, gasket 415, and collar 420 may form a collar assembly 250b that may be configured to prevent or restrict the first middle portion 220 and the second middle portion 230 from separating. Alternately, a different mechanism may be used to prevent or restrict the first middle portion 220 from separating from an adjacent portion of a self-locking telescopic leg.

The tube 264 may include one or more openings 450 substantially opposite the collar assembly 250b which may be configured to allow one or more bearings 455 to bind between a lock device 475a (depicted in FIG. 4a) or a lock device 475b (depicted in FIG. 4b) and the tube of an adjacent portion of a self-locking telescopic leg, such as tube 262 of FIG. 2. In some embodiments, the openings 450 may be shaped and/or configured to restrict and/or guide the motion of the bearings 455 such that the bearings may roll or otherwise move within the boundary created by the openings 450. For example, the bearings 455 and a ramp 460 (e.g. a ramp 460a of FIG. 4a and/or a ramp 460b of FIG. 4b) may be sized such that as the bearings 455 roll along the ramp 460 and such that the bearings 455 remain in the openings 450. While the one or more openings 450 are depicted as rounded rectangles, different shapes are also within the scope of the present disclosure. While the one or more bearings 455 are depicted as spherical in shape, different shapes may be used.

The lock device 475a depicted in FIG. 4a may include the ramp 460a and a plug 465a. The ramp 460a may be conical, frustoconical, pyramidal, or an irregular shape. The ramp 460a may include a first ramp end with a narrow diameter and a second ramp end with a wider diameter. In these and other embodiments, the second ramp end may be sized according to the size of the tube 264. For example, the second ramp end may have a diameter such that a radius of the second ramp end may fill a substantial radial portion of the tube 264, such as, without limitation, approximately between fifty and ninety percent of the tube 264, or between thirty and ninety-nine percent of the tube 264. The ramp 460a may be configured to allow the one or more bearings 455 to roll along the ramp 460a when a leg of which the first middle portion 220 is a part is extended, such as the self-locking telescopic leg 110 of FIG. 2. The plug 465a may be configured to prevent or restrict the one or more bearings 455 from moving from the tube 264 to an adjacent tube, such as the tube 262 of FIG. 2. Additionally or alternatively, the plug 465a may work cooperatively with the ramp 460a to retain the bearings 455 within a space defined longitudinally by a wide end of the ramp 460a and the plug 465a.

A gasket 470a may be placed around the ramp 460a adjacent to the plug 465a and may be configured to allow quicker locking of the leg 110 and to eliminate or reduce rattling of the one or more bearings 455. The lock device 475a may be held in place in relation to the tube 264 through the use of a pin (not expressly depicted in FIG. 4a) that may be inserted through a pin opening 440 on the tube 264 and a pin opening 435a on the lock device 475a. While the pin opening 440 is depicted in a stop ring opening 485b, it may also be located on the main body of the tube 264 or in another location. While the pin opening 440 and pin opening 435a are depicted as having a circular cross section, other cross-sectional areas may also be used. The one or more openings 450, one or more bearings 455, lock device 475a, pin openings 435a and 440, and pin may form a lock mechanism 490a that may prevent or restrict the first middle portion 220 from retracting with respect to an adjacent portion of a self-locking telescopic leg, such as the upper portion 210 of FIG. 2.

The lock device 475b depicted in FIG. 4b may include the ramp 460b and a plug 465b that may be analogous to the ramp 460a and the plug 465a. A washer 470b may be placed around the ramp 460b adjacent to the plug 465b that may be configured to allow quicker locking of the leg 110 and to eliminate or reduce rattling of the one or more bearings 455. The lock device 475b may include a spring 495b which may be configured to bias the washer 470b towards the wide end of the ramp 460b. Biasing the washer 470b towards the wide end of the ramp 460b may bias the one or more bearings 455 towards the wide end of the ramp 460b, which may help lock the leg 110.

The lock device 475b may be held in place in relation to the tube 264 through the use of a pin, a tension fit, or any other connection mechanism. For example, the lock device 475b may be held in place by the use of a stop ring 480b which may rest upon a stop ring opening 485b. The stop ring opening 485b may be part of the plug 465b or may be part of the tube 264, or any other component such that the stop ring 480b may maintain the lock device 475b in place. Additionally or alternatively, the lock device 475b may be held in place in relation to the tube 264 through the use of a pin (not expressly depicted in FIG. 4b) that may be inserted through a pin opening 440 on the tube 264 and a pin opening 435b on the lock device 475b. The one or more openings 450, one or more bearings 455, lock device 475b, stop ring opening 485b, etc. may form a lock mechanism 490b that may prevent or restrict the upper portion 210 and the first middle portion 220 from retracting.

A stop ring 480a and the stop ring 480b of both FIGS. 4a and 4b may be configured to be placed in a stop ring opening 485a and the stop ring opening 485b, respectively. The stop rings 480a and 480b in combination with the collar assembly 250a may be configured to prevent the first middle portion 220 and an adjacent portion, such as the upper portion 210 of FIG. 2, from separating. The stop ring 480b may also facilitate the lock device 475b staying in place.

In some embodiments, the lock mechanism 490a and 490b may be self-locking. For example, using the spring 495b or simply by rolling along the ramp 460a or 460b, the bearings 455 may lock tubes in location relative to each other without a user of the device invoking any button, switch, lever, feature, or other mechanism to lock the tubes in location. Additionally or alternatively, the lock mechanism 490a and 490b may allow for an infinite number of adjustable lengths within the extension range of the tubes.

Figure 5A:
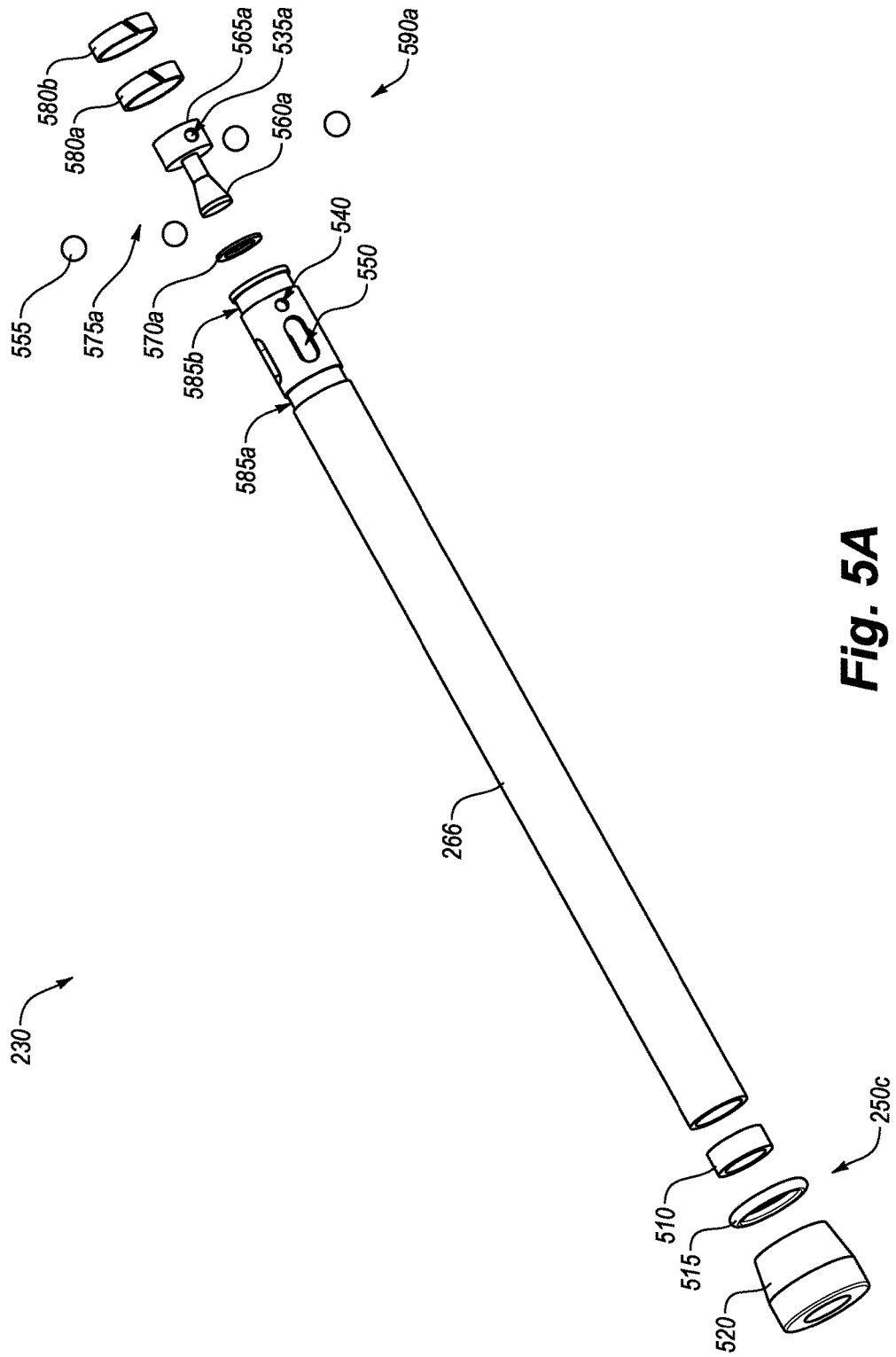
FIG. 5a illustrates a first example embodiment of a second middle portion of a self-locking telescopic leg.

Modifications, additions, or omissions may be made to the example embodiments of the first middle portion 220 of FIGS. 4a and 4b without departing from the scope of the present disclosure. For example, the first middle portion 220 may include either of the lock mechanisms 490a or 490b, or variations thereof. As another example, rather than the spring 495b in FIG. 4b, any biasing mechanism, member, or apparatus may be used. For example, magnetic forces, electrical forces, or other forces generated by aligning or switching polarities may be used to bias the bearings 455 towards the wide end of the ramp 460b. Additionally, the visual depiction of the first middle portion 220 is for example purposes of describing principles of some embodiments of the present disclosure and is not limiting. Any number of visual appearances of a first middle portion are within the scope of the present disclosure FIGS. 5a and 5b depict example embodiments of a second middle portion 230 of a self-locking telescopic leg, such as the leg 110 of FIG. 2. The second middle portion 230 may be substantially similar in form, function, and/or operation to the first middle portion 220 of FIGS. 4a and 4b. For example, the second middle portion 230 of FIGS. 5a and 5b may be slidably coupled with the first middle portion 220 of FIGS. 4a and 4b such that the second middle portion 230 may be substantially disposed within the first middle portion 220 in a collapsed state, or may be extended such that a substantial length of the second middle portion 230 is disposed outside of the first middle portion 220.

Figure 6A:
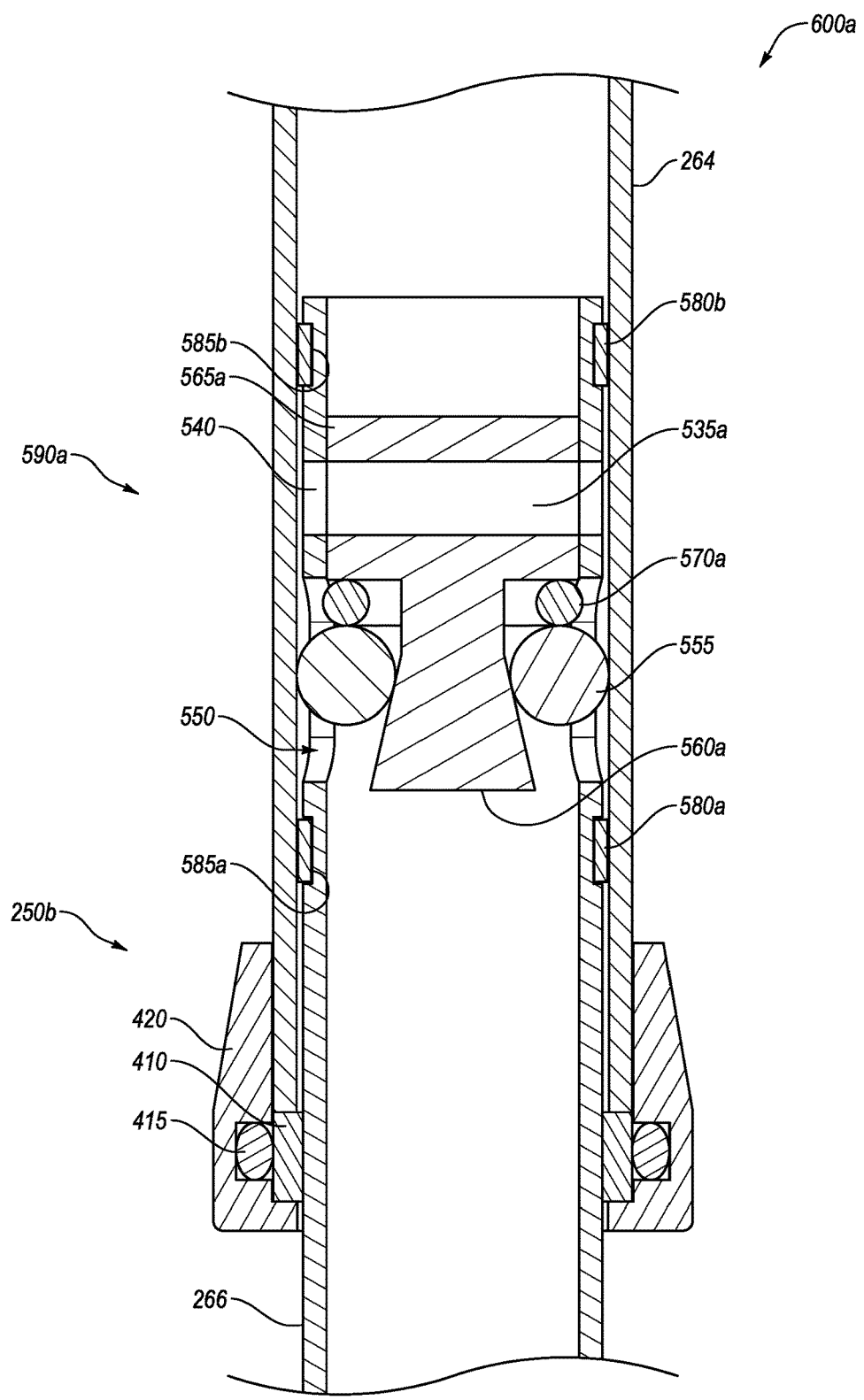
FIG. 6a illustrates a cross-sectional view of a first example embodiment of a lock mechanism of a middle portion of the self-locking telescopic leg.
Figure 6B:
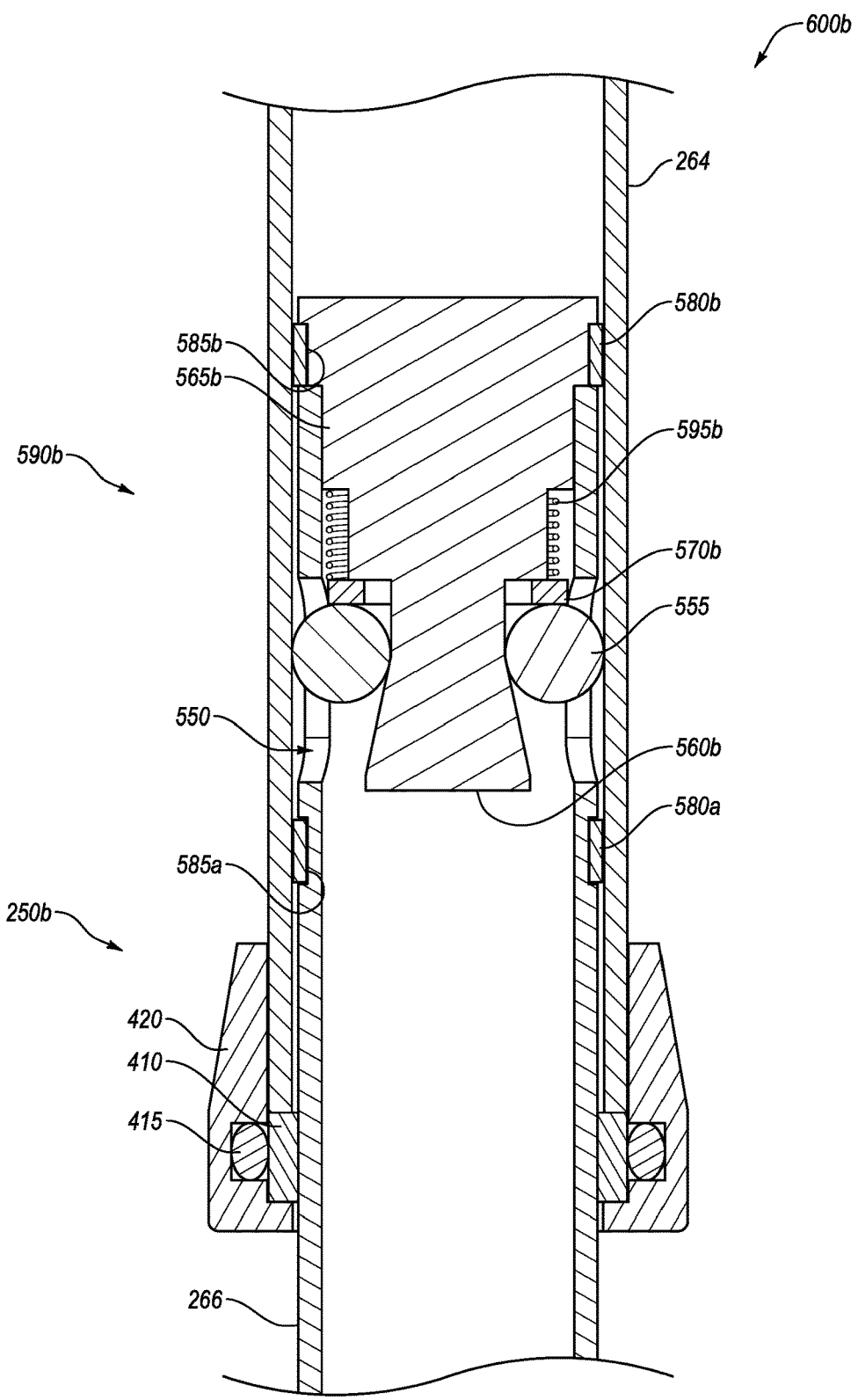
FIG. 6b illustrates a cross-sectional view of a second example embodiment of a lock mechanism of a middle portion of the self-locking telescopic leg.

FIGS. 6a and 6b depict a cross-sectional view of a lock mechanism 590a and 590b, respectively that may be present in a portion (such as the first middle portion 220, the second middle portion 230, etc. of FIG. 2) of a self-locking telescopic leg 600a and 600b, respectively (such as the leg 110 of FIG. 2). While described pertaining to a link between two middle portions, such as the first middle portion 220 and the second middle portion 230 of FIG. 2, identical or similar connections may be found between any adjacent portions, such as between the upper portion 210 and the first middle portion 220 of FIG. 2 or between other middle portions if there are more than two middle portions, etc. The collar assembly 250b on the tube 264 combined with the stop ring 580a on the tube 266 may be configured to prevent or restrict the first middle portion 220 and second middle portion 230 from fully separating. As the tube 266 is extended away from the tube 264, the stop ring 580a may come into contact with the wiper 410, preventing or restricting any further extension of the tube 266.

In some embodiments, the pin opening 535a of the lock mechanism 590a may be aligned and/or sized with the pin opening 540 of the tube 266 such that a pin may be fit inside pin openings 540 and 535a, which may keep the lock mechanism 590a in a stationary position relative to the tube 266. While the alignment and position of a pin may be described with respect to components illustrated in FIG. 6a, the same principles are equally applicable to FIG. 6b.

The lock mechanism 590a depicted in FIG. 6a may include the tubes 264 and 266, one or more openings 550, one or more bearings 555, ramp 560a, plug 565a, and gasket 570a. As the tube 266 is extended relative to the other tube 264 such that a larger portion of the tube 266 is no longer disposed within the tube 264, the one or more bearings 555 may be configured to roll along the ramp 560a away from the wide end of the ramp 560a of the plug 565a, which may allow free extension of the tube 266 relative to the tube 264. However, when a retractive force is applied to the tube 266 relative to the tube 264, the one or more bearings 555 may be configured to roll along the ramp 560a towards the wide end of the ramp 560a such that the bearings 555 may contact an interior wall of the tube 264 through the one or more openings 550. Such interference may create pressure between the one or more bearings 555, the ramp 560a, and the interior wall of the tube 264. Such pressure may restrict motion of the tubes 264 and 266 relative to each other (for example by counteracting, resisting, or overcoming the retractive force), and may lock the tubes 264 and 266 in location relative to each other. The gasket 570a may be configured to allow quicker locking of the tubes 264 and 266 and eliminate or reduce rattling of the bearings 555.

The lock mechanism 590b depicted in FIG. 6b may involve the tubes 264 and 266, one or more openings 550, one or more bearings 555, a ramp 560b, plug 565b, and a washer 570b. As the tube 266 is extended relative to the tube 264 such that a larger portion of the tube 266 is no longer disposed within the tube 264, the one or more bearings 555 may be configured to roll along the ramp 560b away from the wide end of the ramp 560b of the plug 565b and into the spring 595b, which may allow free extension of the tube 266 relative to the tube 264. However, when a retractive force is applied to the tube 266 relative to the tube 264, the one or more bearings 555 may be configured to roll along the ramp 560b (either with assistance from the spring 595b or without assistance) and in the direction of the bias of the spring 595b and contact the interior wall of the tube 264 through the one or more openings 550, such interference creating pressure between the one or more bearings 555, the ramp 560b, and the interior wall of the tube 264. Such pressure may restrict motion of the tubes 264 and 266 relative to each other (for example by counteracting, resisting, or overcoming the retractive force), and may lock the tubes 264 and 266 in location relative to each other. In some embodiments, the spring 595b may create additional pressure to more strongly lock the tubes 264 and 266 in location relative to each other. The washer 570b may be configured to allow quicker locking of the tubes 264 and 266 and eliminate or reduce rattling of the bearings 555.

In some embodiments, the lock mechanism 590a and 590b may be self-locking. For example, using the spring 595b or simply by rolling along the ramp 560a or 560b, the bearings 555 may lock the tubes 264 and 266 in location relative to each other without a user of the device invoking any button, switch, lever, feature, or other mechanism to lock the tubes 264 and 266 in location. Additionally or alternatively, the lock mechanism 590a and 590b may allow for an infinite number of adjustable lengths within the extension range of the tubes 264 and 266.

Modifications, additions, or omissions may be made to the second middle portion 230 of FIG. 5a or 5b and/or the lock mechanism 590a or 590b of FIG. 6a or 6b without departing from the scope of the present disclosure. Any number of visual appearances of a middle portion and/or a lock mechanism are within the scope of the present disclosure.

Figure 7:
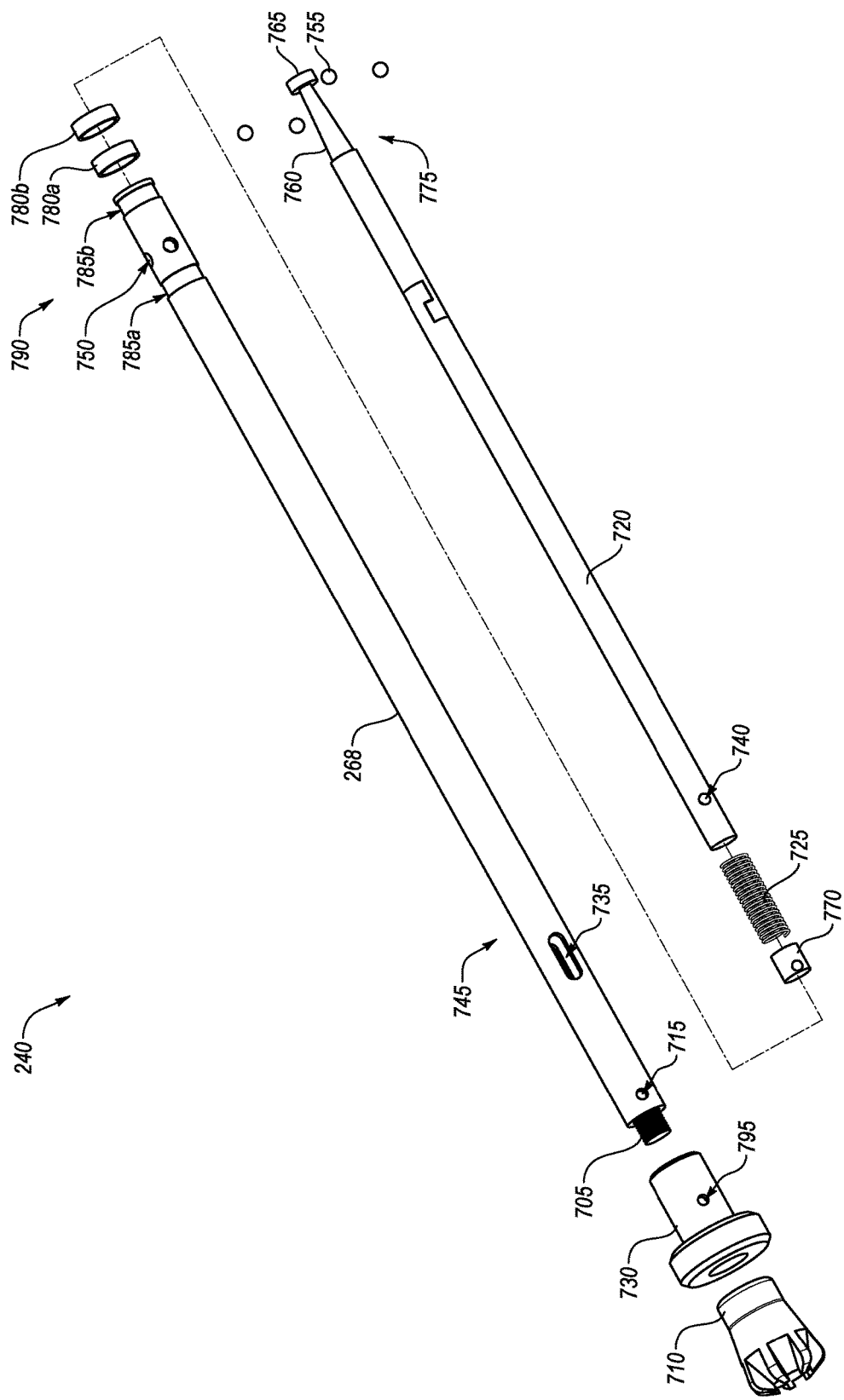
FIG. 7 illustrates an example embodiment of a lower portion of a self-locking telescopic leg.

FIG. 7 illustrates an example embodiment of a lower portion 240 of a self-locking telescopic leg, such as the leg 110 of FIG. 2. The lower portion 240 of the leg 110 may include a tube 268. The tube 268 may be a straight cylinder as depicted in FIG. 7 or the tube 268 may have any other cross-sectional shape and longitudinal curvature. A leg release knob 730 may be placed at one end of the tube 268, and/or may be disposed partially up the tube 268. The leg release knob 730 may be attached to the tube 268 through an opening 735. A foot 710 may be placed below the leg release knob 730 at the end of the tube 268. The foot 710 may be attached to the tube 268 through the opening 715. While the openings 715 and 735 may be depicted with a given shape, any shape may be used and/or any other mechanism may be used to couple the foot 710 and/or the release knob 730 to the tube 268.

A spring 725 and a release rod 720 may be disposed inside the tube 268, with the spring 725 contacting both the foot 710 and the release rod 720. For example, the spring 725 may be disposed between the foot 710 and the release rod 720 such that a spring force of the spring 725 may bias the release rod 720 away from the foot 710. Additionally or alternatively, any biasing mechanism, member, or apparatus may be used to cause the release rod 720 to be biased away from the foot 710. In these and other embodiments, the lower portion 240 may include a retention member 770 that may be configured to retain the spring 725 within the tube 268. In some embodiments, the lower portion 240 may not include the retention member 770. Additionally or alternatively, the lower portion 240 may or may not include a set screw 705 that may be disposed proximate the spring 725, for example, between the spring 725 and the retention member 770. The set screw 705 may be configured to adjust the tension of the spring 725, although any other mechanism or feature may also be used to adjust the tension of the spring 725, or may be omitted. While the release rod 720 may be depicted as a straight cylinder, the release rod 720 may have any other cross-sectional shape and longitudinal curvature.

In some embodiments, the release rod 720 may be coupled to the leg release knob 730 through the use of a pin (not expressly depicted in FIG. 7) through an opening 795 on the leg release knob 730, the opening 735, and the opening 740. The leg release knob 730, opening 735, opening 740, release rod 720, spring 725, foot 710, and opening 715 may be configured as a release mechanism 745, which may be configured to allow the release rod 720 to slide slightly towards the foot 710 relative with the tube 268 when a user exerts force on the leg release knob 730 but to be biased away from the foot 710 otherwise. The opening 735 may serve as a guide and/or stop for the pin coupling the leg release knob 730 to the release rod 720, likewise guiding and/or stopping the related motion of the release rod 720 relative to the tube 268. While the opening 735 is depicted as a rounded rectangle, different shapes are also within the scope of the present disclosure. While the opening 740 is depicted with a circular cross-section, other cross-sections are also within the scope of the present disclosure. The release mechanism 745 may be configured to allow portions of a self-locking telescopic leg to be retracted, such as the first middle portion 220, the second middle portion 230, and the lower portion 240.

The tube 268 may include one or more openings 750 substantially opposite the release mechanism 745, which may be configured to allow one or more bearings 755 to bind between a lock device 775 and the tube 266 (not expressly depicted in FIG. 7) in which the tube 268 may be disposed as illustrated in FIG. 2. While the one or more openings 750 are depicted as circles, different shapes are also within the scope of the present disclosure. While the one or more bearings 755 are depicted as spherical in shape, different shapes may be used. The lock device 775 may include a ramp 760 and a plug 765. The lock device 775 may be an integrated part of the release rod 720, substantially opposite where the release rod 720 may contact the spring 725. The lock device 775 may also be implemented as one or more separate components from the release rod 720. The ramp 760 may be conical, frustoconical, pyramidal, or some other regular or irregular shape. The ramp 760 may be configured to allow the one or more bearings 755 to roll along the ramp 760 when a leg of which the lower portion 240 is a part is extended, such as the self-locking telescopic leg 110 of FIG. 2. The ramp 760 may include a first ramp end with a narrow diameter and a second ramp end with a wider diameter. In these and other embodiments, the second ramp end may be sized according to the size of the tube 268. For example, the second ramp end may have a diameter such that a radius of the second ramp end may fill a substantial radial portion of the tube 268, such as, without limitation, approximately between fifty and ninety percent of the tube 268, or between thirty and ninety-nine percent of the tube 264. The plug 765 may be configured to prevent or restrict the bearings 755 from moving from the tube 268 to an adjacent tube, such as the tube 266 of FIG. 2. A gasket may be placed around the ramp 760 adjacent to the plug 765 that may be configured to allow quicker locking of the leg 110 and to eliminate or reduce rattling of the one or more bearings 755. The lock device 775 may be held in place in relation to the tube 268 through the bias action of the spring 725. The one or more openings 750, the one or more bearings 755, and the lock device 775 may form a lock mechanism 790 that may prevent or restrict the lower portion 240 from retracting relative to an adjacent portion, such as the second middle portion 230 of FIG. 2. A stop ring 780a and a stop ring 780b may be configured to be disposed in a stop ring opening 785a and a stop ring opening 785b. The stop rings 780a and 780b in combination with a collar assembly of an adjacent portion, such as the collar assembly 250c of the second middle portion 230 of FIG. 2, may be configured to prevent or restrict the lower portion 240 from separating from the adjacent portion, such as the second middle portion 230. Alternatively or additionally, a different mechanism may be used to prevent or restrict the portions from separating.

Modifications, additions, or omissions may be made to the lower portion 240 of FIG. 7 without departing from the scope of the present disclosure. For example, any configuration and/or structure of the foot 710 and/or the leg release knob 730 may be utilized. Additionally, the visual depiction of the lower portion 240 is for example purposes of describing principles of some embodiments of the present disclosure and is not limiting. Any number of visual appearances of a lower portion are still within the scope of the present disclosure.

Figure 8A:
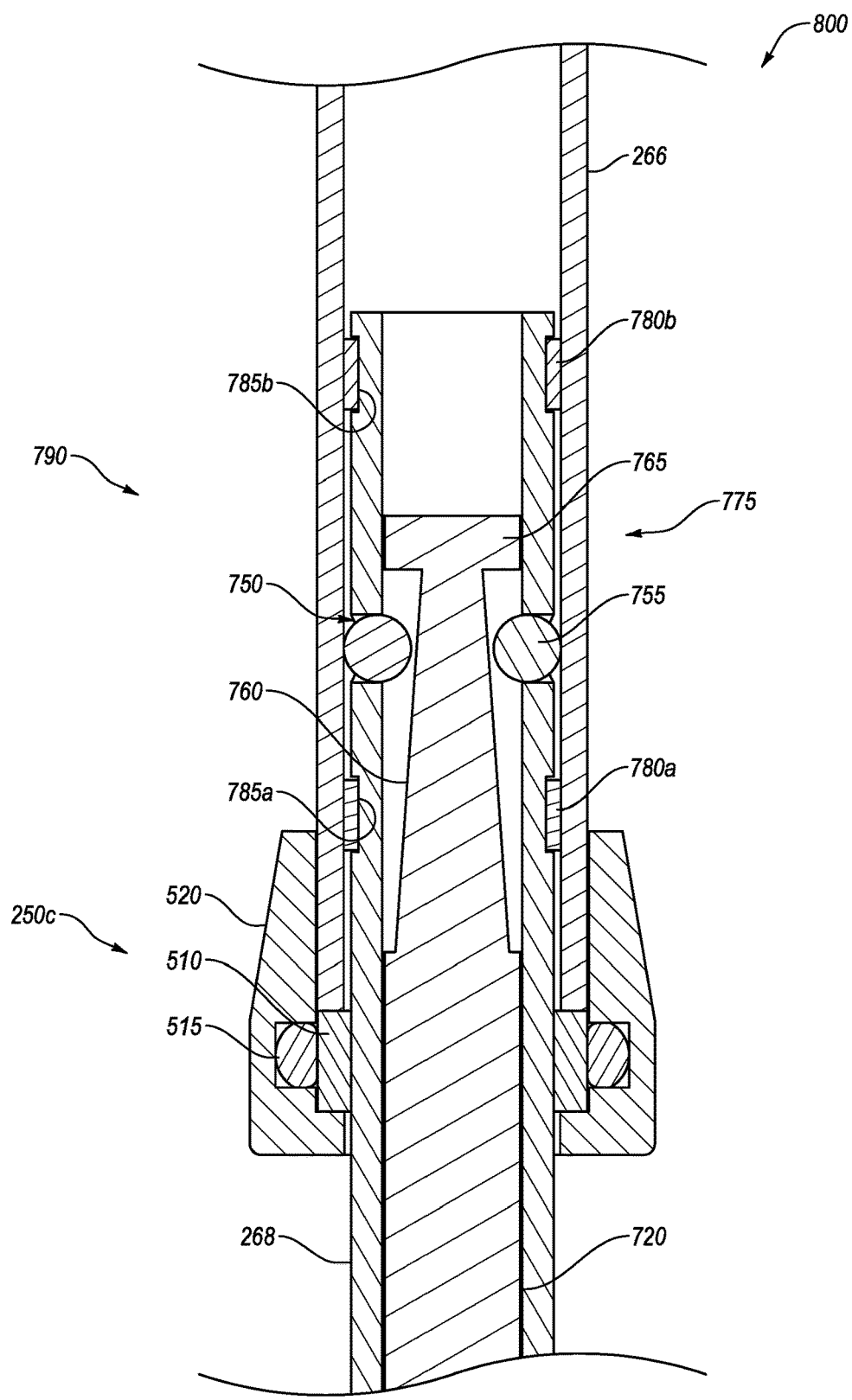
FIG. 8a illustrates a cross-sectional view of an example embodiment of a lock mechanism of a lower portion of a self-locking telescopic leg in an unlock configuration.
Figure 8B:
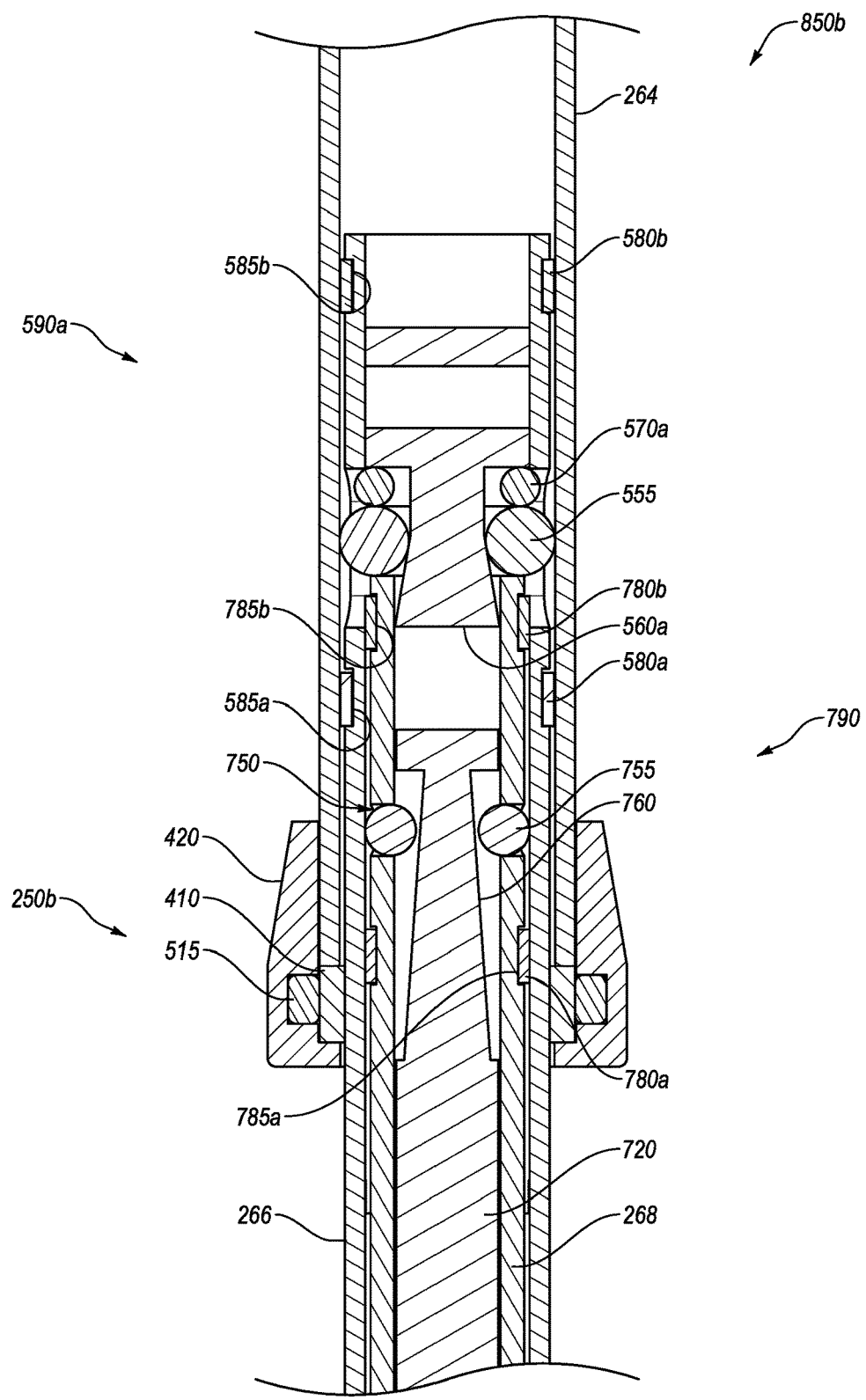
FIG. 8b illustrates another view of a first example embodiment of a lock mechanism of a lower portion of a self-locking telescopic leg in an unlock configuration.
Figure 8C:
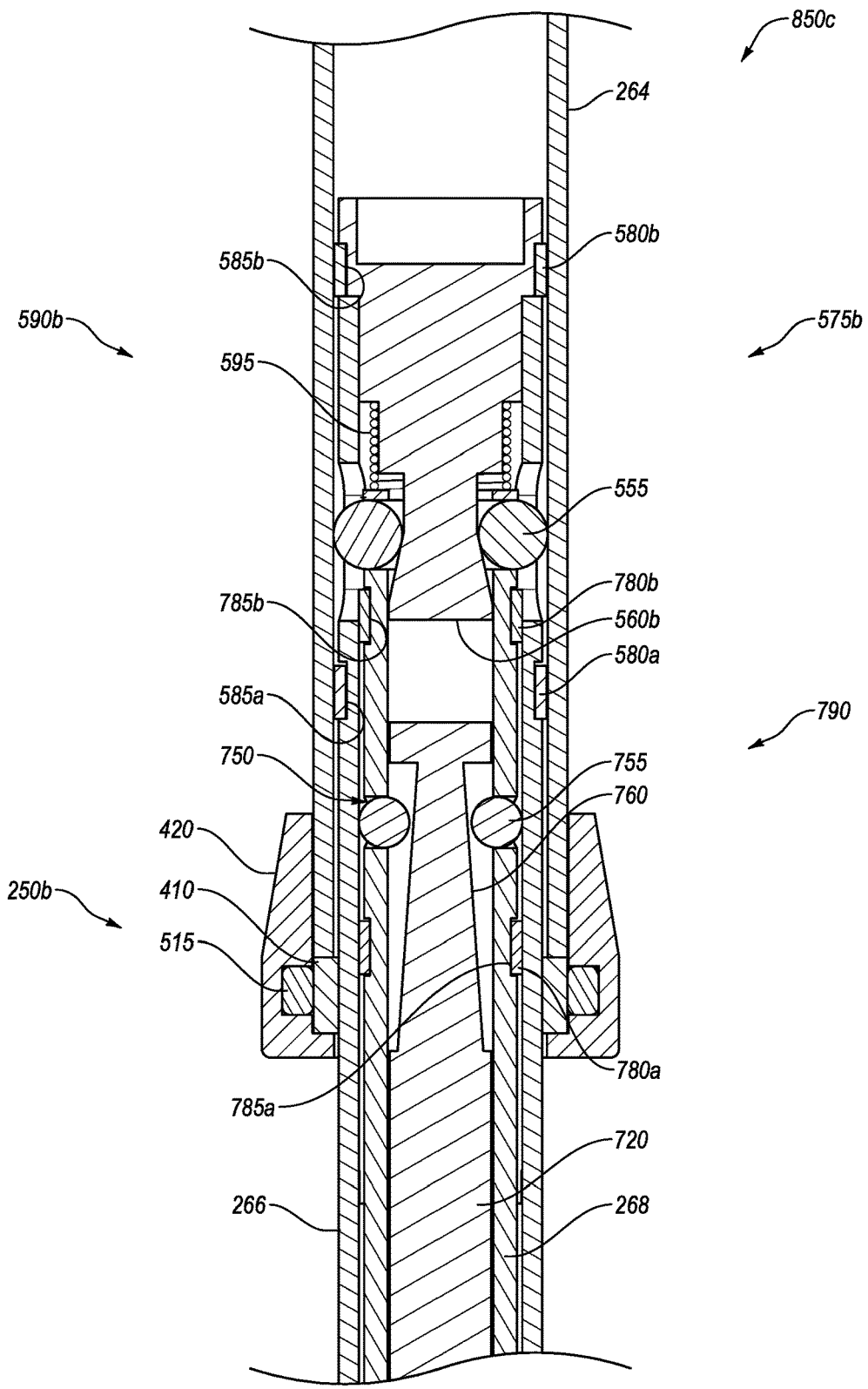
FIG. 8c illustrates a view of a second example embodiment of a lock mechanism of a lower portion of a self-locking telescopic leg in an unlock configuration.

FIGS. 8a, 8b, and 8c illustrate, among other things, the operation of lock mechanisms as they are released and/or unlocked, in accordance with some embodiments of the present disclosure. FIG. 8a illustrates the lock mechanism 790 of FIG. 7 and the collar assembly 250c with respect to tubes 266 and 268 of FIG. 2. FIGS. 8b and 8c illustrate the lock mechanisms 590a and 590b of FIGS. 5a and 5b (respectively), and the tubes 264, 266, and 268 of FIG. 2.

FIG. 8a illustrates a cross-sectional view of the lock mechanism 790 of FIG. 7 on a lower portion (such as the lower portion 240 of FIG. 2) of a self-locking telescopic leg (such as the leg 110 of FIG. 2) in an unlock configuration. In some embodiments, the lock mechanism 790 may be configured such that as the release rod 720 is moved away from the tube 266, one or more bearings 755 may roll along a ramp 760 towards a plug 765 such that the one or more bearings 755 may not lock or otherwise restrict the motion of the tube 268 relative to the tube 266, even if the tube 268 is retracted further within the tube 266.

A collar assembly 250c (e.g. the collar assembly 250c of FIG. 2) on a tube 266 in combination with the stop ring 780a on a tube 268 may be configured to prevent or restrict the tube 266 and the tube 268 from fully separating. For example, as the tube 268 is extended away from the tube 266, the stop ring 780a may come into contact with the wiper 510, preventing or restricting any further extension of the tube 268.

The lock mechanism 790 may include the tubes 266 and 268, one or more openings 750, one or more bearings 755, a ramp 760, and a plug 765. As the tube 268 is extended away from the tube 266, the one or more bearings 755 may be configured to roll along the ramp 760 towards the plug 765, which may allow free extension of the tube 268. However, when a retractive force is applied to the tube 268 relative to the tube 266, the one or more bearings 755 may be configured to roll along the ramp 760 towards a wide end of the ramp 760 such that the bearings 755 may contact the interior wall of the tube 266 through the one or more openings 750, such interference creating pressure between the one or more bearings 755, the ramp 760, and the tube 266. Such pressure may lock or otherwise restrict motion of the tubes 266 and 268 relative to each other (for example by counteracting, resisting, or overcoming the retractive force). A gasket may be configured to allow quicker locking of the tubes 266 and 268 and eliminate or reduce rattling of the one or more bearings 755.

When a leg release knob (such as the leg release knob 730 of FIG. 7) is pulled, an associated spring (such as the spring 725 of FIG. 7) may no longer exert force on a release rod 720, which may cause gravity to pull the release rod 720 towards a foot (such as the foot 710 of FIG. 7) and allow the one or more bearings 755 to roll along the ramp 760 and away from the tube 266, allowing the tube 268 to be retracted into the tube 266. While gravity is described as the force to pull the release rod 720 towards the foot, any other mechanism and/or feature may be used to pull the release rod 720 towards the foot. For example, the release rod 720 may be biased by a spring with a lower spring force than the spring 725 such that as the spring 725 is overcome by force of a user, the spring with the lower spring force may push the release rod 720 towards the foot. As another example, the leg release knob 730 may be coupled with the release rod 720 such that as the leg release knob 730 is pulled towards the foot, the release rod 720 may also be pulled towards the foot such that the one or more bearings 755 may roll along the ramp 760 towards the plug 765.

FIGS. 8a, 8b, and 8c illustrate a cross-sectional view of example embodiments of the lock mechanism 790 associated with the tubes 266 and 268, which may be present in a portion of a self-locking telescopic leg 800, and the lock mechanisms 590a (FIG. 8b) and 590b (FIG. 8c) associated with the tubes 264 and 266, which may be present in a portion of a self-locking telescopic leg 850b and 850c, respectively. After the tube 268 is fully or substantially retracted into the tube 266, the tube 268 may be spaced, shaped, and/or configured to come into contact with the one or more bearings 555. The tube 268 may push the one or more bearings 555 along the ramp 560a (FIG. 8b) or the ramp 560b (FIG. 8c) away from a wide end of the ramp 560a or 560b, releasing the one or more bearings 555 from locking or otherwise restricting the motion of the tube 266 relative to the tube 264. For example, releasing the one or more bearings 555 may allow retraction of the tube 266 into the tube 264. In some embodiments, after each tube is fully retracted or substantially retracted into the next larger tube, the tube just retracted may push against the bearings of the locking mechanism for the next larger tube such that the next larger tube may be retracted.

In the embodiment illustrated in FIG. 8c, the tube 268 may be retracted with sufficient force to compress a spring 595 of the locking mechanism 590b before the one or more bearings 555 may roll along the ramp 560b towards the spring 595.

Modifications, additions, or omissions may be made to the embodiments illustrated in FIG. 8a, 8b, or 8c without departing from the scope of the present disclosure. Additionally, the visual depiction of the illustrated embodiments is for example purposes of describing principles of some embodiments of the present disclosure and is not limiting. Any number of visual appearances of the embodiments are still within the scope of the present disclosure.

Figure 9A:
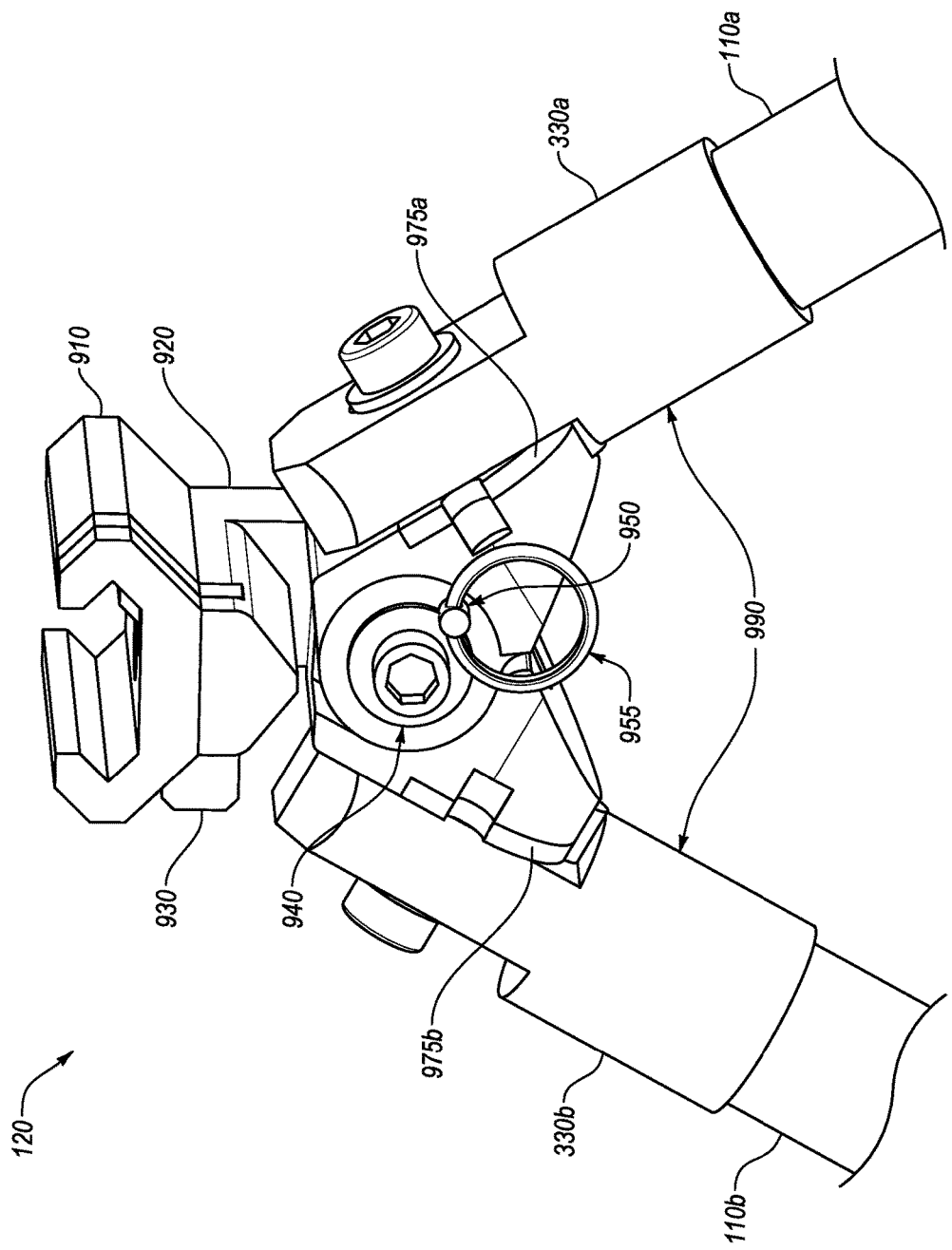
FIG. 9a illustrates a front view of an example embodiment of a torso of an adjustable bipod.
Figure 9B:
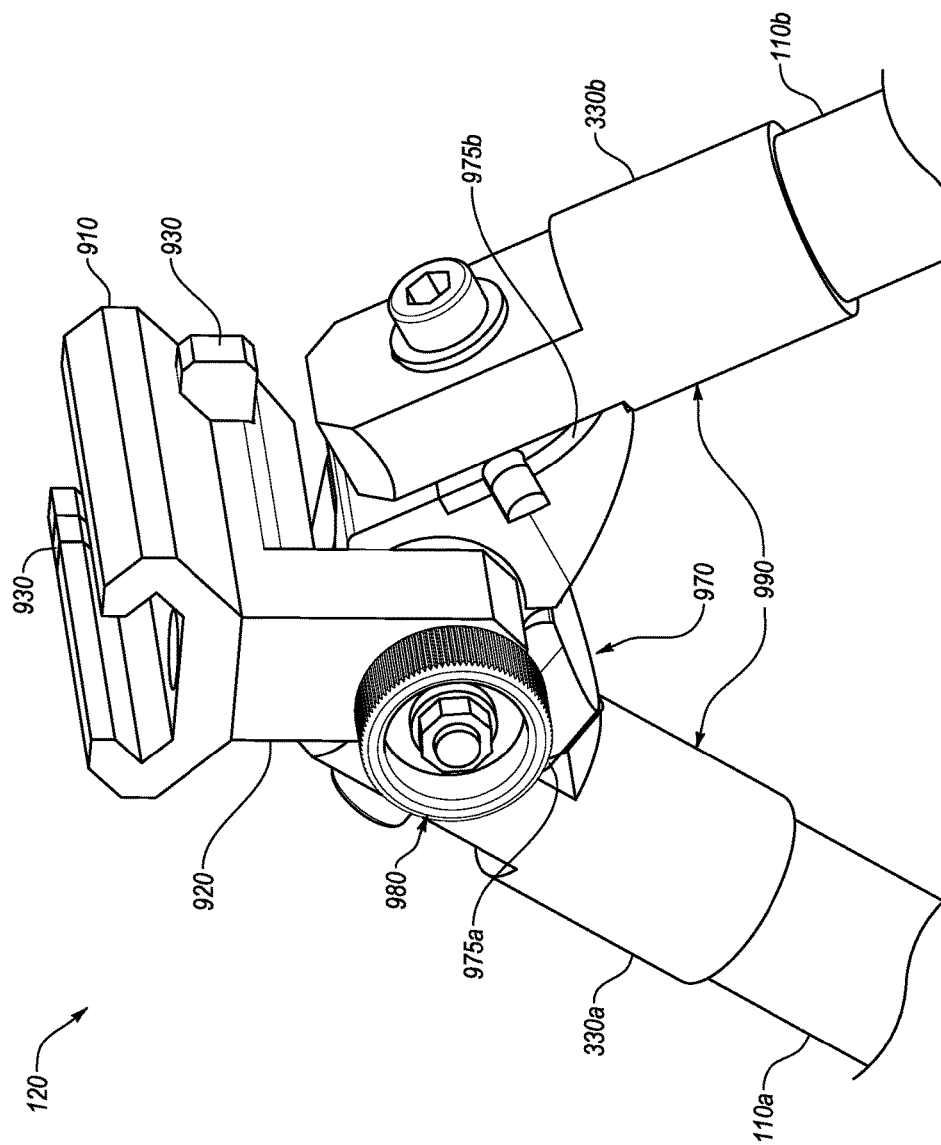
FIG. 9b illustrates a back view of an example embodiment of a torso of an adjustable bipod.

FIGS. 9a and 9b illustrate a front view and a rear view, respectively, of the torso 120 of FIG. 1 of an adjustable bipod. The torso 120 may include a connection block 910 that may be configured to connect the adjustable bipod 100 to an object like a firearm, a camera, binoculars, a monocular, a scope, etc. A release button 930 may be configured to allow easy removal of the adjustable bipod 100 from the supported object. An axle assembly 940 may be configured to connect an axle block 920 and articulating pelvic block assembly 970, as well as to enable the connection block 910 and the supported object to tilt from side to side. A tension nut 980 may allow the user to alter the tension to change the tilt of the connection block 910. The axle block 920 may be configured to connect an axle assembly 940 to the connection block 910. Such rotational movement may allow for leveling of a supported object such as a camera or firearm. For example, if one leg of an adjustable bipod is positioned at a higher height than the other leg due to the terrain on which the adjustable bipod is being used, the axle block 920 and thus the connection block 910 may not be level with the ground when in a default position. As a result, the supported object may not be level with the ground. By adjusting the tension nut 980, it may be possible to rotate the axle block 920 and thus the connection block 910 and the supported object to make them level with the ground.

A spreader pin hole 950 and a spreader pin and ring 955 may be configured to allow a user to change an angle 990 between the two self-locking telescopic legs 110a and 110b when they are in a deployed position. The angle 990 may be modified by varying the angle between components of the pelvic block assembly 970. Hip blocks 330a and 330b may be configured to connect the two self-locking telescopic legs 110a and 110b to the pelvic block assembly 970, and thus to the axle assembly 940. The pelvic block assembly 970 may include reinforcing plates 975a and 975b (described in further detail with respect to FIG. 15).

Modifications, additions, or omissions may be made to the torso 120 illustrated in FIGS. 9a and 9b without departing from the scope of the present disclosure. For example, any configuration, shape, or collection of features of the torso 120 may be used to couple a supported object to the self-locking telescopic legs 110a and 110b. The embodiment illustrated may provide additional features but are not necessary. Additionally, the visual depiction of the torso 120 is for example purposes of describing principles of some embodiments of the present disclosure and is not limiting. Any number of visual appearances of a torso are still within the scope of the present disclosure.

Figure 10:
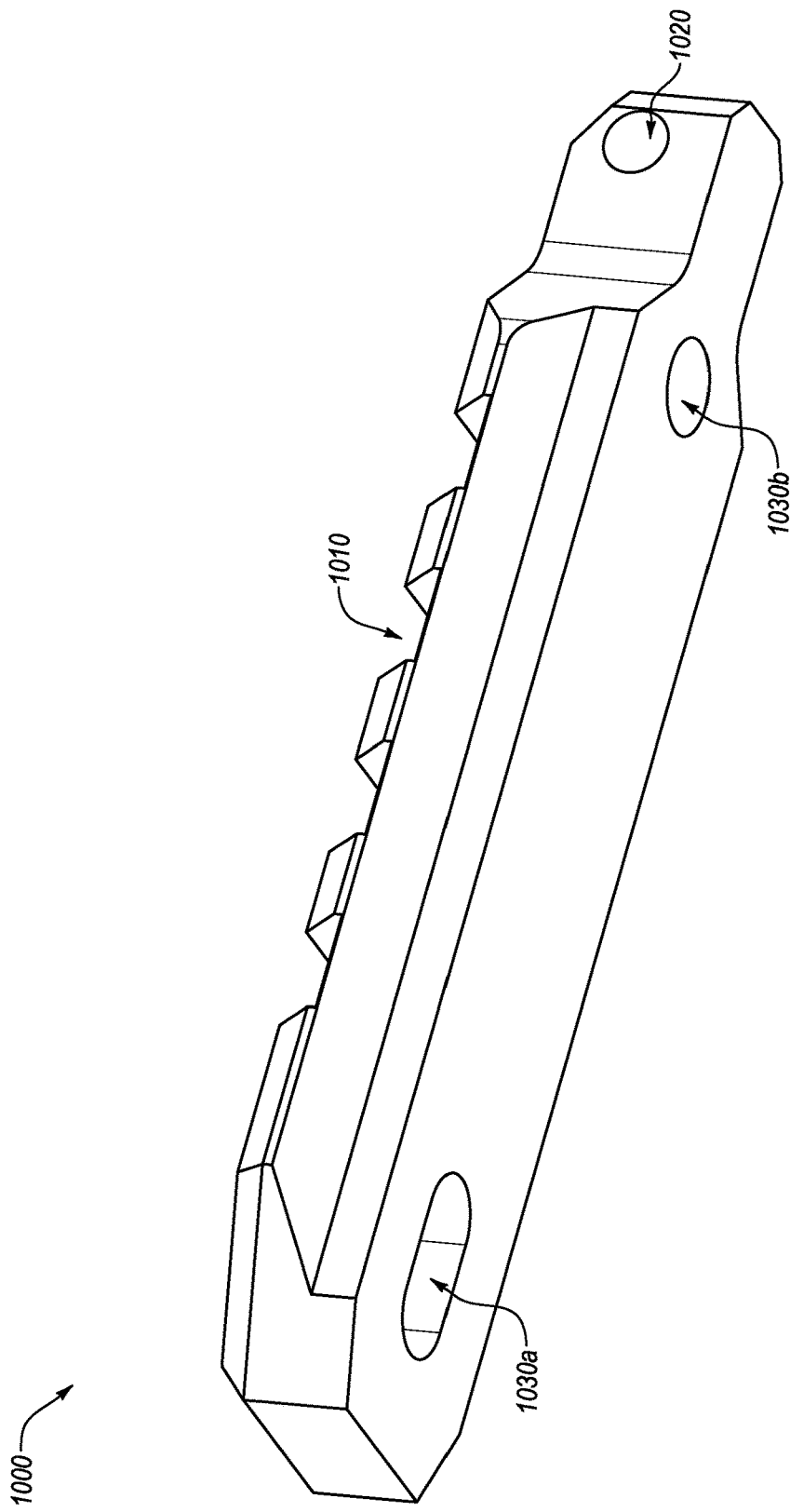
FIG. 10 illustrates an example configuration of an adapter.

FIG. 10 illustrates an example configuration of an adapter 1000. The adapter 1000 may be configured to attach to a supported object such as a firearm, a camera, etc. and may be configured to allow the connection block 910 (for example the connection block 910 of FIG. 11) to be coupled with the supported object. The adapter 1000 may include one or more lock and release openings 1010. The lock and release openings 1010, when combined with a release button (such as the release button 930 of FIGS. 9a and 9b) may be configured to enable a torso (such as the torso 120 of FIG. 1) to connect to a supported object by the connection block 910 (such as the connection block 910 of FIG. 11) connecting to adapter 1000. Holes 1030a and/or 1030b may allow a user to connect the adapter 1000 to a firearm or other supported object. Alternately, a different connection mechanism may also be employed to attach the adapter 1000 to a firearm or other supported object. When the adapter 1000 is configured to connect to a firearm, the adapter 1000 may take the shape of a standard Picatinny rail. In some embodiments, the adapter 1000 may also include a sling attach point 1020 that may be configured to allow attachment of a sling for carrying the supported object.

Figure 11:
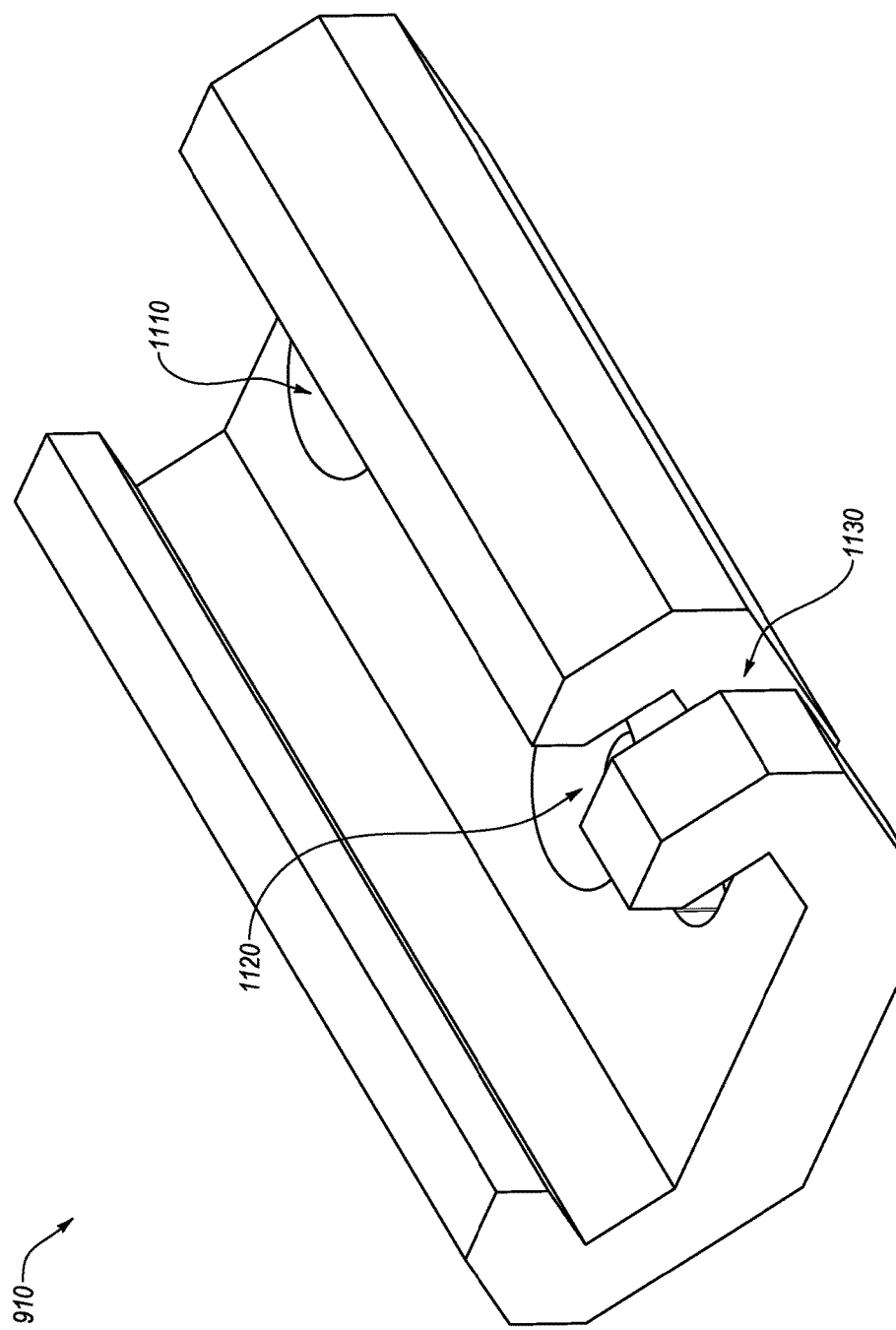
FIG. 11 illustrates an example configuration of a connection block.

FIG. 11 depicts an example configuration of the connection block 910 of FIGS. 9a and 9b. The connection block 910 may be configured to enable a torso such as the torso 120 of FIGS. 9a and 9b to attach to and detach from a supported object. For example in the illustrated embodiment, the connection block 910 may be configured to attach to and detach from the adapter 1000 of FIG. 10, which may be attached to a firearm or other supported object. The connection block 910 may be configured to slide onto any suitable rail, for example the adapter 1000. When configured for use with firearms, connection block 910 may take the shape of a standard Picatinny rail receiving-block. Holes 1110 and 1120 may be configured to allow the block to be coupled to the axle block 920 of FIGS. 9a and 9b. While holes 1110 and 1120 are depicted with circular cross-sections, different cross-sectional shapes are also within the scope of the present disclosure. Opening 1130 may be configured to enable the connection block 910 to lock on a rail, any supported object, or adapter 1000 through the use of the release button 930 (such as the release button 930 of FIG. 12).

Figure 12:
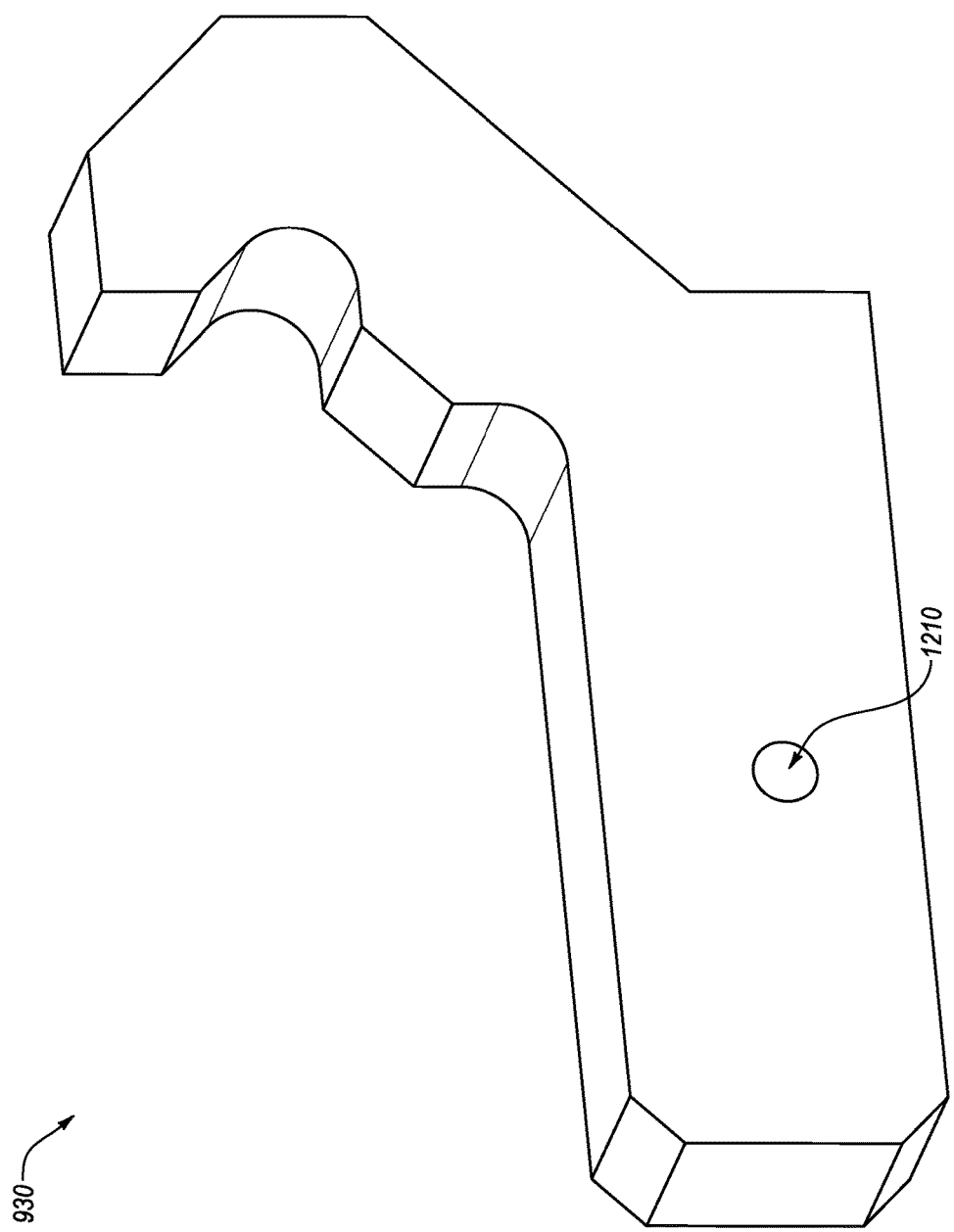
FIG. 12 illustrates an example configuration of a release button.

FIG. 12 illustrated an example configuration of the release button 930. The release button 930 may be configured to both lock and unlock the connection between the connection block 910 of FIGS. 9a and 9b and a rail, any supported object, or the adapter 1000 of FIG. 10. The release button 930 may include a hole 1210 about which the release button 930 may pivot or for coupling the release button 930 to one or more other components of the torso 120. Additionally or alternatively, the release button 930 may be coupled to a spring to bias the release button in a particular orientation, such as locked, and the spring may be coupled to the release button 930 via the hole 1210.

Figure 13:
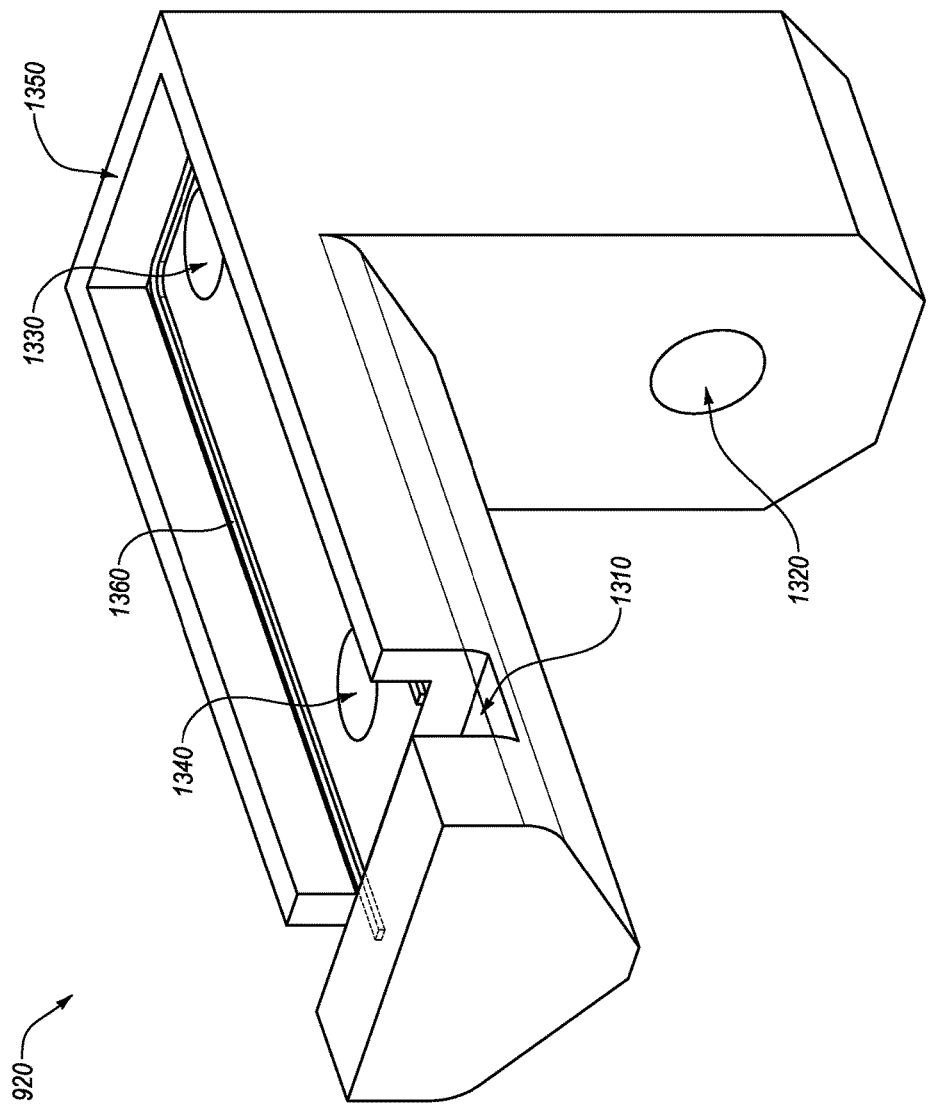
FIG. 13 illustrates an example configuration of an axle block.
Figure 14:
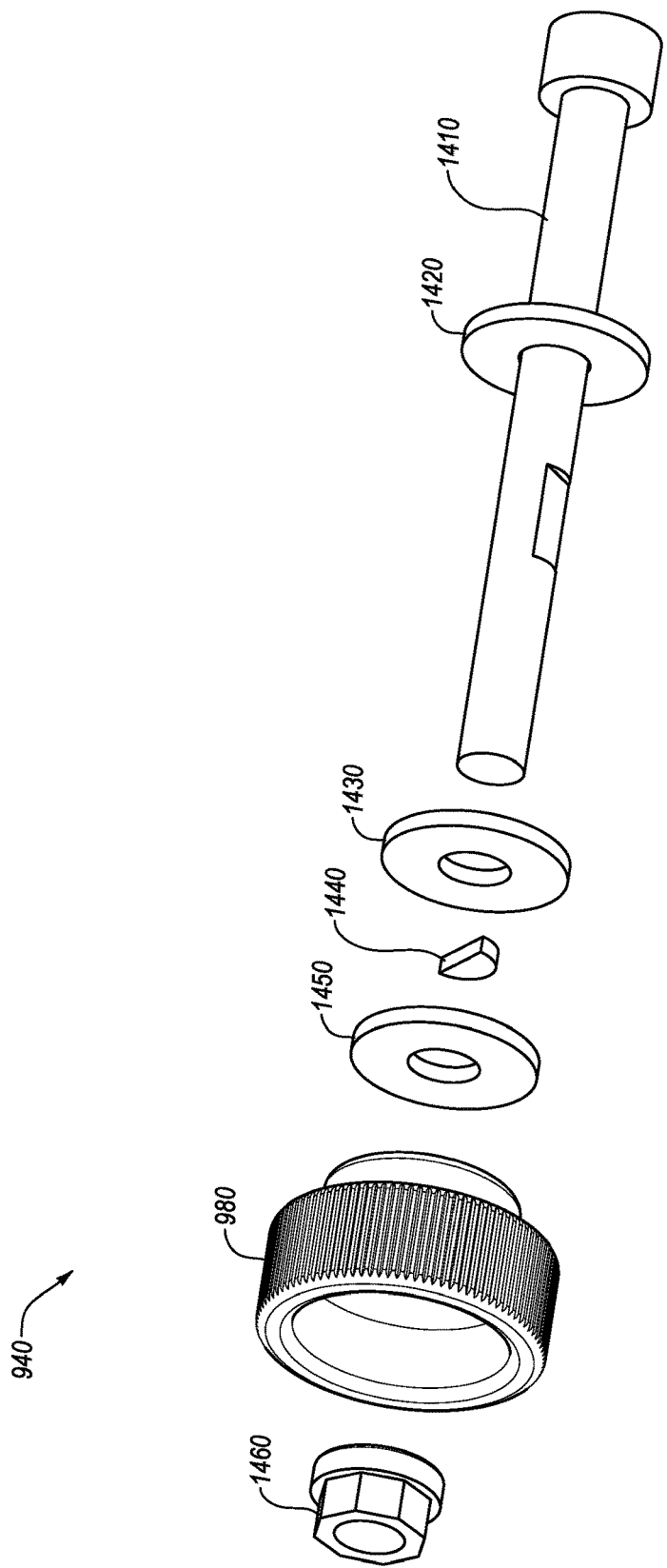
FIG. 14 illustrates an example configuration of an axle assembly.

FIG. 13 illustrates an example configuration of the axle block 920, which may be configured to connect the connection block 910 of FIG. 11 to the axle assembly 940 of FIG. 14. Holes 1330 and/or 1340 may be configured to allow the connection block 910 (such as FIG. 11) to be connected to axle block 920 on top of block seating area 1350. The release button 930 may be positioned in a release button opening 1310. The axle assembly 940 (illustrated in greater detail in FIG. 14) may connect through an axle block axle hole 1320. The shapes depicted in FIG. 13 are exemplary only and other potential shapes are possible for the different parts of the axle block.

In some embodiments, the release button 930 may be coupled to a spring 1360 which may bias the release button 930 towards a middle of the connection block 910 (for example, the connection block 910 shown in FIG. 11). Using the spring 1360, the release button 930 may be pushed and/or pulled away from the middle of the connection block 910 to allow a rail or other supported object to enter the connection block 910, and when released, the spring 1360 may bias the release button 930 such that the release button 930 engages the rail or other supported object now in the connection block 910.

FIG. 14 illustrates an example configuration of the axle assembly 940, which may be configured to connect articulating pelvic blocks (such as those in the pelvic block assembly 970 of FIG. 9b) to an axle block (such as the axle block 920 of FIGS. 9a and 9b). The axle assembly 940 may also be configured to allow rotational movement between the articulating pelvic blocks and the axle block, which may allow a firearm or other supported object attached to a connection block to tilt from side to side. An axle 1410 may be inserted into an articulating pelvic block assembly axle hole (such as articulating pelvic block assembly axle hole 1850 of FIG. 18) and through an axle block axle hole (such as the axle block axle hole 1320 of FIG. 13). The tension nut 980 may be connected to the axle 1410 on the rear side of a torso (such as the torso 120 of FIG. 9b). A nut 1460 may be connected to the axle 1410 after the tension nut 980. Washers 1420, 1430, and 1450 may be used on the axle 1410 between the pelvic block assembly (e.g. the pelvic block assembly 970 illustrated in greater detail in FIG. 15) and the axle block (e.g. the axle block 920 of FIG. 13). The washer 1430 may be a curved disk spring washer as depicted in FIG. 14 or may be a plain washer or any other type of washer. A half-circle 1440 may be referred to as a Woodruff Key and may be configured to lock the axle block (e.g. the axle block 920) and the axle 1410 together.

Modifications, additions, or omissions may be made to the embodiments illustrated in FIGS. 10, 11, 12, 13, and 14 without departing from the scope of the present disclosure. For example, in some embodiments, rather than the half-circle 1440 Woodruff Key, a set screw may be utilized to allow rotational movement between the articulating pelvic blocks and the axle block. For example, a seat on the axle 1410 may receive a set screw such that the set screw, traversing the axle block 920, may couple the axle block 920 and the axle 1410 such that as the axle 1410 is rotated, the axle block 920 may also be rotated. Additionally or alternatively, the set screw may be loosened such that the axle 1410 may rotate independently of the axle block 920. Additionally, the visual depiction of the embodiments illustrated is for example purposes of describing principles of some embodiments of the present disclosure and is not limiting. Any number of visual appearances of the illustrated embodiments are still within the scope of the present disclosure.

Figure 15:
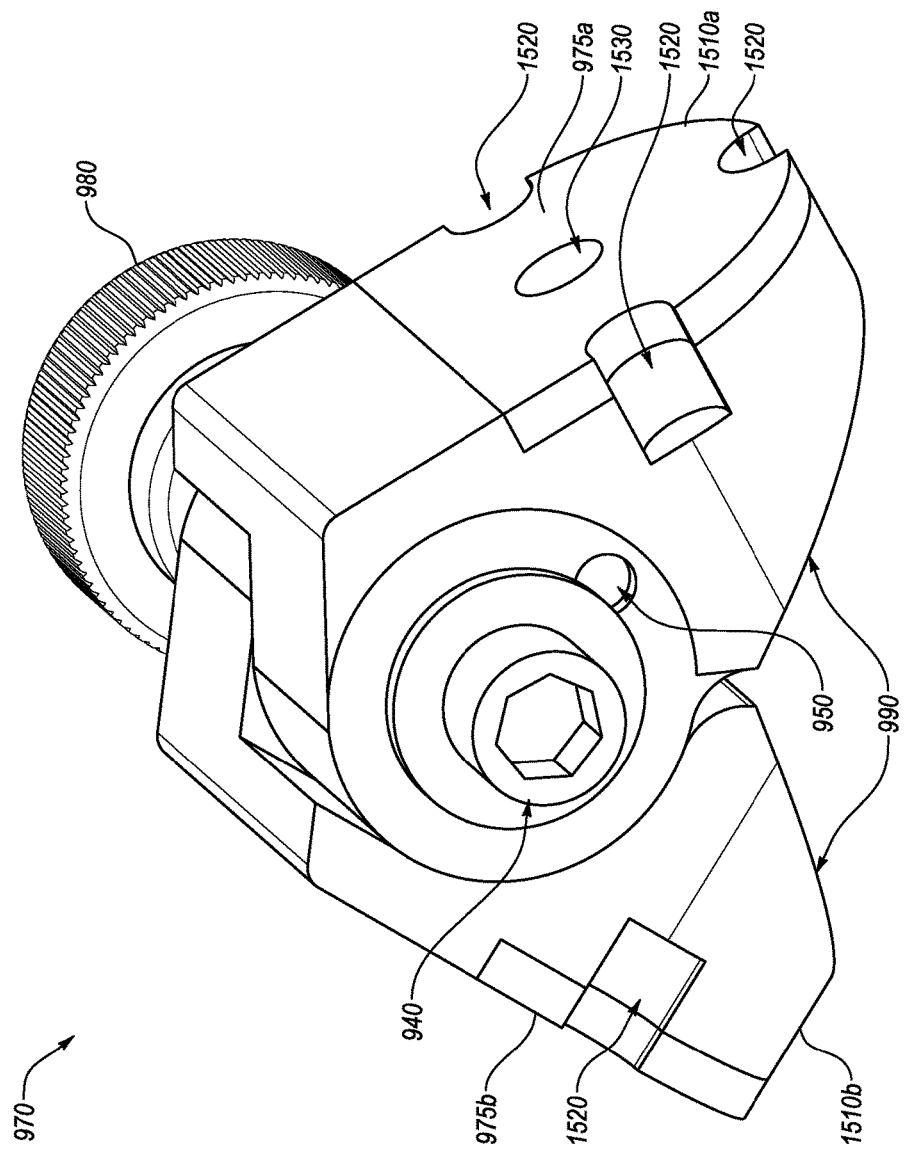
FIG. 15 illustrates an example configuration of articulating pelvic blocks.

FIG. 15 illustrates an example configuration of the articulating pelvic block assembly 970, which may couple hip blocks (such as the hip blocks 330a and 330b of FIG. 3 and/or FIGS. 9a and 9b) to an axle block (such as the axle block 920 of FIGS. 9a and 9b) by use of the axle assembly 940. The pelvic block assembly 970 may include two pelvic blocks 1510a and 1510b to which the hip blocks may attach through a hip block attachment hole 1530 (the corresponding hole on 1510a not expressly depicted in FIG. 15). The hip blocks 1510a and 1510b may include reinforcing plates 975a and 975b, respectively. The pelvic block assembly 970 may be configured to allow legs coupled to the pelvic blocks 1510a and 1510b to spread open when the legs are in a deployed position, for example, by increasing the angle 990 between the legs while the legs are in the deployed position.

Figure 16:
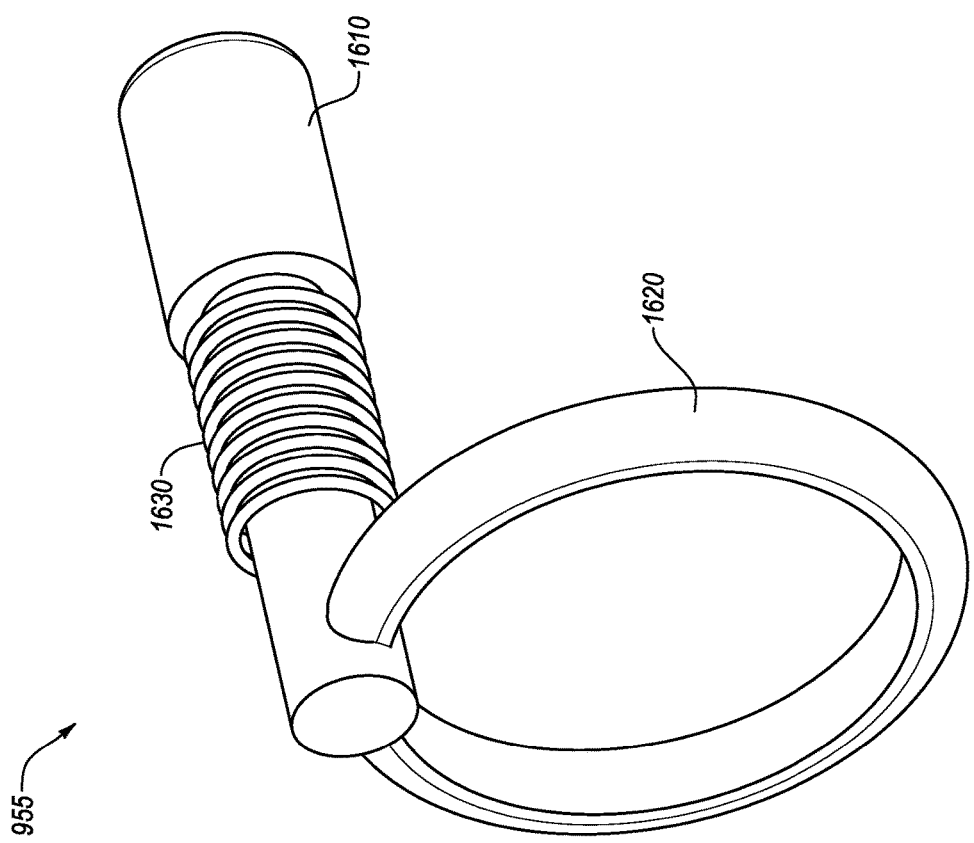
FIG. 16 illustrates an example configuration of a spreader pin and ring.

The spreader pin hole 950 may be configured to receive a spreader ring and pin (for example, a spreader ring and pin as illustrated in FIG. 16), which may lock the legs at a standard angle 990 in the deployed position. When the spreader ring and pin are removed, the pelvic blocks 1510a and 1510b may be rotated about the axle assembly 940, increasing the angle 990 and widening the angle between the legs. The spreading of the legs may also be prevented or restricted by the contact of the two pelvic blocks 1510a and 1510b, which may limit either or both of a minimum or a maximum angle. As the legs spread further apart, parts of the pelvic blocks 1510a and 1510b may come into contact with each other, preventing or restricting any further rotation of the pelvic blocks 1510a and 1510b about the axle assembly 940. In addition, converging the legs in order to insert the spreader pin and ring into the spreader hole 950 or for another reason may eventually be prevented or restricted by the contact of the two pelvic blocks 1510a and 1510b. As the legs converge, decreasing the angle 990 between the legs, parts of the pelvic blocks 1510a and 1510b may come into contact with each other, preventing or restricting any further rotation of the pelvic blocks 1510a and 1510b about the axle assembly 940.

In addition, the pelvic block assembly 970 may allow the legs to rotate forward or backward. Pelvic blocks 1510a and 1510b may include one or more indents 1520, which may be configured to allow the legs to be locked in different positions. As depicted, the indents 1520 may allow the legs to be locked in three positions: forward, deployed, and backward. Additional indents 1520 may also be added to the pelvic blocks 1510a and 1510b to provide more options or fewer indents 1520 could also be used. In these and other embodiments, the reinforcing plates 975a and 975b may be shaped, constructed, and/or configured to reinforce the pelvic blocks 1510a and 1510b. For example, the reinforcing plates 975a and 975b may be constructed of stainless steel such that as the legs are rotated forward or backward and engage the indents 1520, the reinforcing plates 975a and 975b may receive and bear some or all of the forces applied to the pelvic blocks 1510a and 1510b.

Modifications, additions, or omissions may be made to the pelvic block assembly 970 illustrated in FIG. 15 without departing from the scope of the present disclosure. Additionally, the visual depiction of the pelvic block assembly 970 is for example purposes of describing principles of some embodiments of the present disclosure and is not limiting. Any number of visual appearances of a pelvic block assembly are still within the scope of the present disclosure.

FIG. 16 illustrates an example configuration of a spreader pin and ring 955, which may be configured to lock legs of a bipod in a standard position. The spreader pin and ring 955 may include a spreader pin 1610 and a spreader ring 1620. The spreader pin 1610 may be inserted into the spreader pin hole 950 to prevent or restrict pelvic blocks and any legs coupled to the pelvic blocks (such as the pelvic blocks 1510a and 1510b of FIG. 15 and/or the legs 110a and 110b of FIGS. 9a and 9b) from spreading apart from each other. When the spreader pin 1610 is removed from a spreader hole (such as the spreader pin hole 950 of FIG. 9a), the pelvic blocks may be able to rotate around an axle assembly to increase or decrease an angle between the legs. The spreader ring 1620 may provide a grip for an individual to remove or insert the spreader pin and ring 1600 into the spreader pin hole 950.

In some embodiments, the spreader pin and ring 955 may include a spring 1630 and the spreader pin 1610 may be sized and/or configured such that the spreader pin and ring 955 may not disengage from the pelvic block assembly 970 as the spreader pin 1610 is removed from the spreader pin hole 950. For example, the spreader ring 1620 may be pulled to overcome a spring force of the spring 1630, removing the spreader pin 1610 from the spreader pin hole 950 and allowing the pelvic blocks 1510a and 1510b to rotate about the axle assembly 940. As the pelvic blocks 1510a and 1510b rotate, an additional spreader pin hole may align with the spreader pin 1610 and the spring force of the spring 1630 may reinsert the spreader pin 1610 into the additional hole, locking the pelvic blocks 1510a and 1510b in the new orientation.

Figure 17:
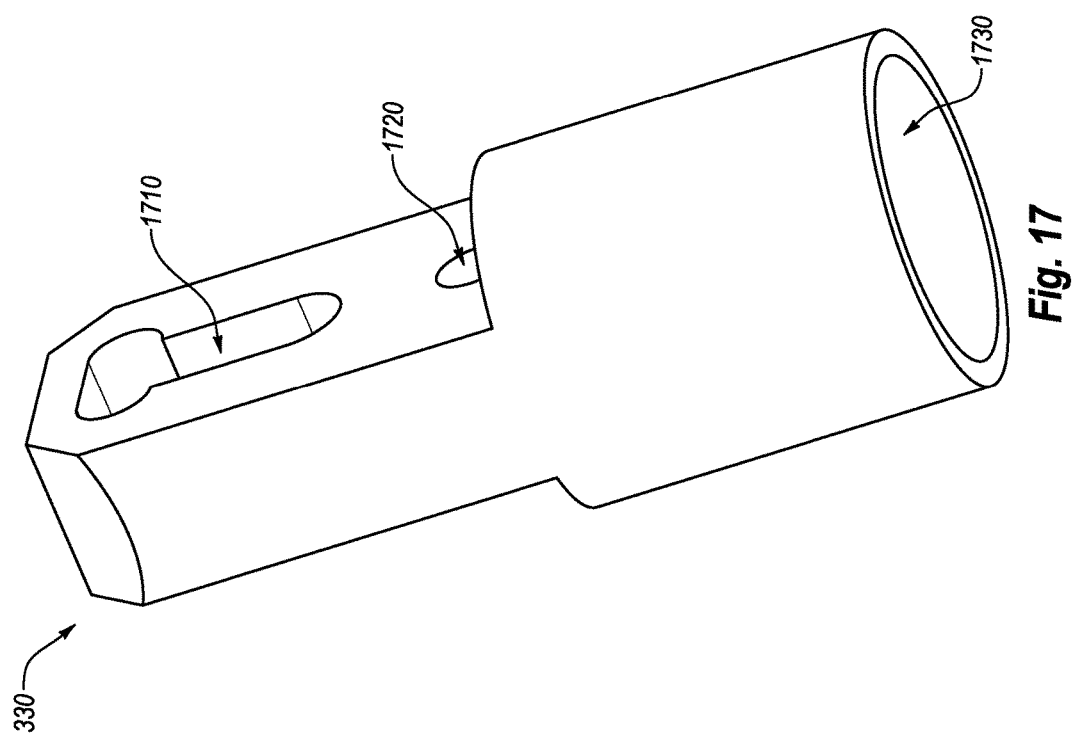
FIG. 17 illustrates an example configuration of a hip block.
Figure 18:
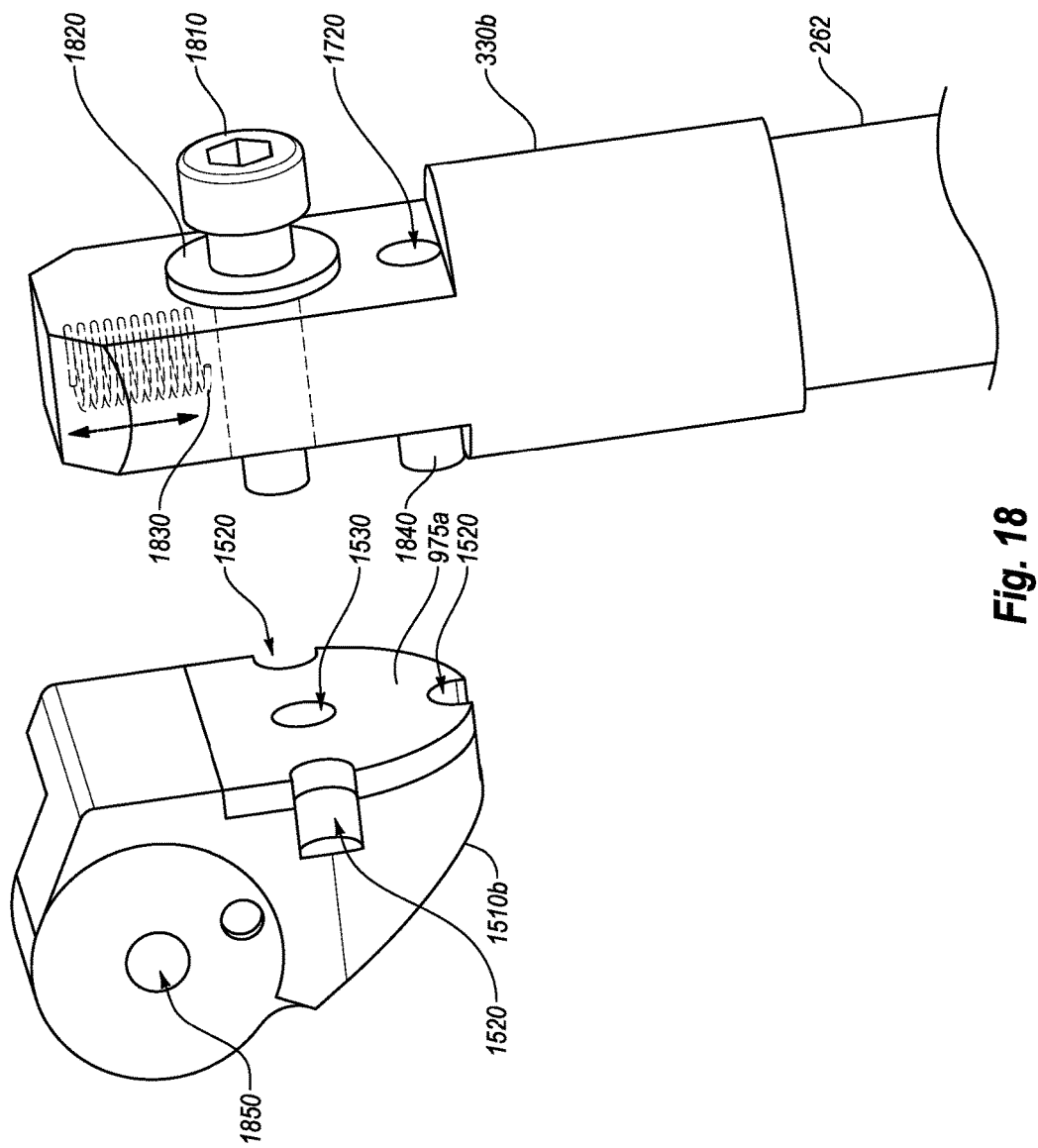
FIG. 18 illustrates an example configuration of a pelvic block and a hip block.

FIG. 17 illustrates an example configuration of a hip block 330 (such as the hip block 330 of FIG. 3), which may couple a leg to a pelvic block. An opening 1710 may be configured to provide a mechanism for the hip block 330 to couple to a pelvic block (such as the pelvic blocks 1510a and 1510b of FIG. 15). In some embodiments, the opening 1710 may be elongated to allow a user to change the legs between different positions such as forward, deployed, and backward. A locking hole 1720, when combined with a locking pin (for example, the locking pin 1840 as depicted in FIG. 18), may be configured to provide a locking mechanism to lock the legs in different positions. While the locking hole 1720 is depicted with a circular cross-section, it may have any cross-sectional area. A hole 1730 may be configured to accept an upper portion of the leg. While the hole 1730 is depicted with a circular cross-section, it may also have any cross-sectional area to match the cross-section of the leg.

FIG. 18 illustrates an example configuration of the pelvic block 1510b and the hip block 330b. The hip block 330b may be coupled to the pelvic block 1510b by a shoulder bolt 1810 and a washer 1820 through an opening on the hip block 330b and hip block attachment hole 1530 on the pelvic block 1510b. The hip block 330b may include a spring 1830, which may be configured to bias the hip block 330b in any position, for example, forward, deployed, or backward. A different biasing mechanism, member, or apparatus may be used. A user may exert force to compress the spring 1830 and allow the position of the hip block 330b to change. A pin 1840, which may be inserted into the locking hole 1720, may be configured to provide the locking mechanism for the position of the hip block 330b. The pin 1840 may be configured to fit inside indents 1520, which may lock the position of the hip block 330b relative to the pelvic block 1510b.

Modifications, additions, or omissions may be made to the embodiments illustrated in FIGS. 16, 17, and 18 without departing from the scope of the present disclosure. For example, any mechanism may be used to couple the hip block 330 to the leg. As another example, the spring 1630 may be omitted, or any other biasing mechanism or member may be used to prevent the spreader pin and ring 955 from disengaging from the pelvic block assembly 970 while removing the spreader pin 1610 from the spreader pin hole 950. Additionally, the visual depiction of the embodiments illustrated is for example purposes of describing principles of some embodiments of the present disclosure and is not limiting. Any number of visual appearances of the illustrated embodiments are still within the scope of the present disclosure.

While the examples in the present disclosure may be described in the context of bipods, a device with any number of telescoping legs is specifically contemplated within the scope of the present disclosure. For example, such a device may include any number of telescopic legs, such as one, two, three, or more. Additionally, even if utilizing a slight modification to implement various features, aspects, and/or characteristics of the present disclosure, any of such features, aspects, and/or characteristics of the present disclosure are equally applicable to a device with any number of telescopic legs, such as, without limitation, rotating or biasing the legs to a particular position, utilizing a locking pin to rapidly spread the legs, or changing the tilt of an object supported by such a device.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. An adjustable support device comprising:
a torso;
a first leg and a second leg, each of the first leg and the second leg being coupled to the torso and being configured to be independently extended to different lengths in a direction away from the torso of the adjustable support device, each of the first leg and the second leg comprising:
a first tube;
a second tube, the first tube slidably disposed inside of the second tube;
a lock device disposed within the first tube and the second tube, the lock device comprising:
a plug disposed at a proximate end of the first tube, the proximate end of the first tube proximate the second tube; and
a ramp with a first ramp end and a second ramp end, the second ramp end wider than the first ramp end, and the first ramp end coupled to the plug and oriented towards the torso of the adjustable support device, the ramp including a taper portion that tapers from the second ramp end to the first ramp end;
one or more bearings configured to roll along the taper portion of the ramp and sized to contact the ramp and at least an interior wall of the second tube as the one or more bearings approach the second ramp end such that as the one or more bearings contact the ramp and the interior wall of the second tube while rolling along the taper portion, interference of the one or more bearings with the interior wall of the second tube increases to inhibit motion of the first tube relative to the second tube; and
a third tube with a proximate end proximate the second tube and a distal end away from the second tube, the third tube slidably disposed inside of the first tube, and in response to the third tube being substantially disposed within the first tube, the proximate end of the third tube configured to push the one or more bearings towards the plug, reducing the interference of the one or more bearings with the interior wall of the second tube.

2. The adjustable support device of claim 1, wherein the torso further comprises a pelvic block assembly configured to position the legs in a deployed, forward, or backward position.

3. The adjustable support device of claim 2, wherein the pelvic block assembly further comprises a spreader pin hole and a spreader pin configured to alter an angle between the legs when the legs are in the deployed position.

4. The adjustable support device of claim 1, wherein the torso further comprises a connection mechanism configured to attach to a supported object.

5. The adjustable support device of claim 4, wherein the torso further comprises an axle assembly configured to rotate an angle of the supported object about the axle assembly.

6. The adjustable support device of claim 4, wherein the connection mechanism includes a Picatinny rail receiving block.

7. The adjustable support device of claim 1, further comprising a biasing member configured to bias the one or more bearings towards the second ramp end.

8. The adjustable support device of claim 1, further comprising:
a release rod with a proximate end proximate the second tube and a distal end away from the second tube, the release rod slidably disposed within the third tube;
a release rod plug disposed at the proximate end of the release rod;

a release rod ramp with a third ramp end and a fourth ramp end, the fourth ramp end wider than the third ramp end, and the third ramp end coupled to the release rod plug;

one or more release rod bearings configured to roll along the release rod ramp and sized to contact the release rod ramp and at least an interior wall of the first tube as the one or more release rod bearings approach the fourth ramp end such that as the one or more release rod bearings contact the release rod ramp and the interior wall of the first tube, interference of the one or more release rod bearings with the interior wall of the first tube inhibits motion of the third tube relative to the first tube;

a release rod biasing member configured to bias the release rod towards the torso of the adjustable support device; and a leg release knob to overcome the release rod biasing member and move the release rod in a direction away from the torso of the adjustable support device.

* * * * *